(12) United States Patent
Ryu et al.

(10) Patent No.: US 10,721,612 B2
(45) Date of Patent: Jul. 21, 2020

(54) METHOD FOR TRACKING AREA UPDATE IN WIRELESS COMMUNICATION SYSTEM AND APPARATUS THEREFOR

(71) Applicant: LG ELECTRONICS INC., Seoul (KR)

(72) Inventors: Jinsook Ryu, Seoul (KR); Sangmin Park, Seoul (KR); Laeyoung Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/087,487

(22) PCT Filed: Mar. 23, 2017

(86) PCT No.: PCT/KR2017/003157
§ 371 (c)(1),
(2) Date: Sep. 21, 2018

(87) PCT Pub. No.: WO2017/164679
PCT Pub. Date: Sep. 28, 2017

(65) Prior Publication Data
US 2019/0116483 A1 Apr. 18, 2019

Related U.S. Application Data

(60) Provisional application No. 62/311,927, filed on Mar. 23, 2016, provisional application No. 62/313,109, (Continued)

(51) Int. Cl.
*H04W 84/04* (2009.01)
*H04W 8/08* (2009.01)
(Continued)

(52) U.S. Cl.
CPC ............. *H04W 8/08* (2013.01); *H04W 4/029* (2018.02); *H04W 12/06* (2013.01);
(Continued)

(58) Field of Classification Search
CPC ....... H04W 8/08; H04W 4/029; H04W 36/00; H04W 76/27; H04W 76/11; H04W 12/06; H04W 36/0022
See application file for complete search history.

(56) References Cited

U.S. PATENT DOCUMENTS

2010/0165940 A1* 7/2010 Watfa ................ H04W 8/08
370/329
2011/0199969 A1* 8/2011 Yang ................. H04W 76/12
370/328
(Continued)

FOREIGN PATENT DOCUMENTS

KR 20140136463 11/2014
WO 2013133663 9/2013
(Continued)

OTHER PUBLICATIONS

PCT International Application No. PCT/KR2017/003157, International Search Report dated Jul. 26, 2017, 3 pages.
(Continued)

*Primary Examiner* — Chi Ho A Lee
(74) *Attorney, Agent, or Firm* — Lee, Hong, Degerman, Kang & Waimey PC

(57) ABSTRACT

Disclosed herein are a method for tracking area update in a wireless communication system and an apparatus therefor. Specifically, a method for user equipment (UE) to perform a tracking area update (TAU) procedure in a wireless communication system comprises: a step of transmitting a TAU request message to a mobility management entity (MME); and a step of receiving a TAU accept message from the
(Continued)

MME, wherein if the UE uses signaling optimization to enable the delivery of user data through a control plane over the MME, and the UE does not have pending user data to be transmitted through a user plane and has pending user data to be transmitted through the control plane over the MME, then a first active flag can be set in the TAU request message.

16 Claims, 25 Drawing Sheets

Related U.S. Application Data filed on Mar. 24, 2016, provisional application No. 62/320,665, filed on Apr. 11, 2016, provisional application No. 62/325,985, filed on Apr. 21, 2016, provisional application No. 62/331,453, filed on May 4, 2016, provisional application No. 62/333,820, filed on May 9, 2016.

(51) Int. Cl.
| | | |
|---|---|---|
| *H04W 60/04* | (2009.01) | |
| *H04W 68/02* | (2009.01) | |
| *H04W 4/029* | (2018.01) | |
| *H04W 76/11* | (2018.01) | |
| *H04W 76/27* | (2018.01) | |
| *H04W 12/06* | (2009.01) | |
| *H04W 36/00* | (2009.01) | |
| *H04W 76/25* | (2018.01) | |
| *H04W 4/70* | (2018.01) | |

(52) U.S. Cl.
CPC ....... *H04W 36/0022* (2013.01); *H04W 60/04* (2013.01); *H04W 68/02* (2013.01); *H04W 76/11* (2018.02); *H04W 76/27* (2018.02); *H04W 4/70* (2018.02); *H04W 76/25* (2018.02); *H04W 84/042* (2013.01)

(56) References Cited

U.S. PATENT DOCUMENTS

| | | | |
|---|---|---|---|
| 2012/0264443 A1* | 10/2012 | Ng | H04W 60/04 |
| | | | 455/450 |
| 2013/0012204 A1* | 1/2013 | Kim | H04W 60/06 |
| | | | 455/435.1 |
| 2013/0077592 A1* | 3/2013 | Wang | H04W 76/28 |
| | | | 370/329 |
| 2013/0150029 A1* | 6/2013 | Jeong | H04W 8/06 |
| | | | 455/432.3 |
| 2013/0329478 A1* | 12/2013 | Yu | G11C 5/063 |
| | | | 365/51 |
| 2014/0219183 A1* | 8/2014 | Xu | H04L 5/0053 |
| | | | 370/329 |
| 2015/0140998 A1 | 5/2015 | Kim et al. | |
| 2015/0327215 A1* | 11/2015 | Xu | H04W 68/005 |
| | | | 455/435.1 |
| 2016/0073308 A1* | 3/2016 | Okabe | H04W 36/12 |
| | | | 370/331 |
| 2016/0262041 A1* | 9/2016 | Ronneke | H04W 52/0216 |
| 2017/0171256 A1* | 6/2017 | Liang | H04L 65/1016 |

FOREIGN PATENT DOCUMENTS

| | | |
|---|---|---|
| WO | 2016003199 | 1/2016 |
| WO | 2016028314 | 2/2016 |

OTHER PUBLICATIONS

European Patent Office Application Serial No. 17770649.6, Search Report dated Oct. 23, 2019, 14 pages.

3rd Generation Partnership Project; Technical Specification Group Core Network and Terminals; Non-Access-Stratum (NAS) protocol for Evolved Packet System (EPS); Stage 3 (Release 13), 3GPP TS 24.301 V13.5.0, Mar. 2016, 414 pages.

LG Electronics, "Active Flag handling in CP-CIoT EPS optimization", C1-162725, 3GPP TSG-CT WG1 Meeting #98, May 2016.

* cited by examiner

[FIG. 1]
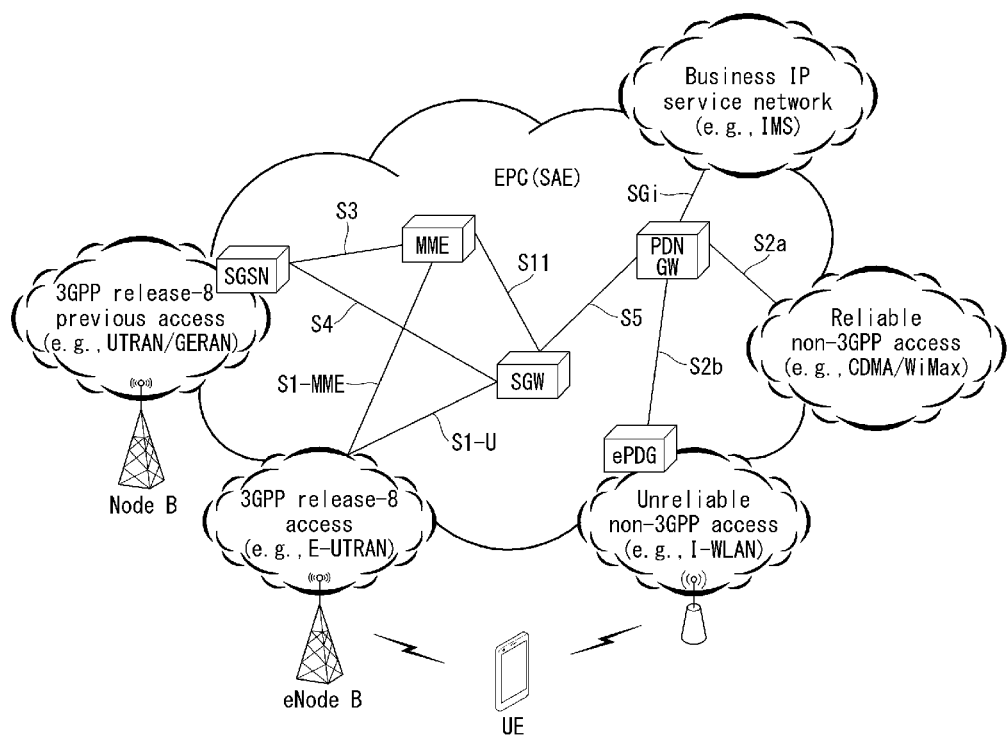

[FIG. 2]
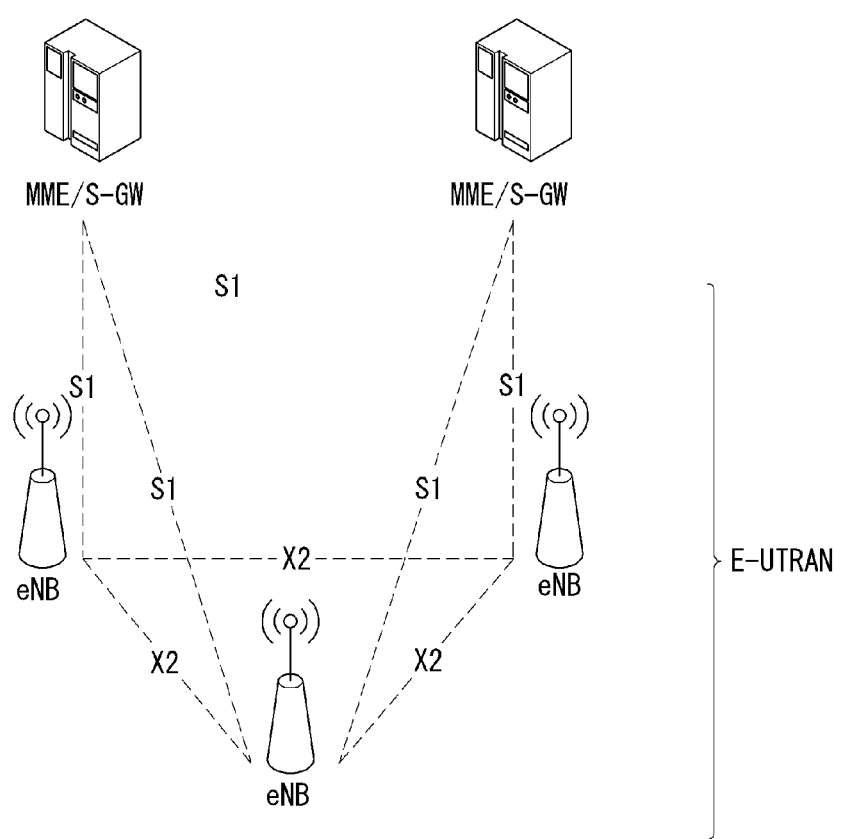

[FIG. 3]
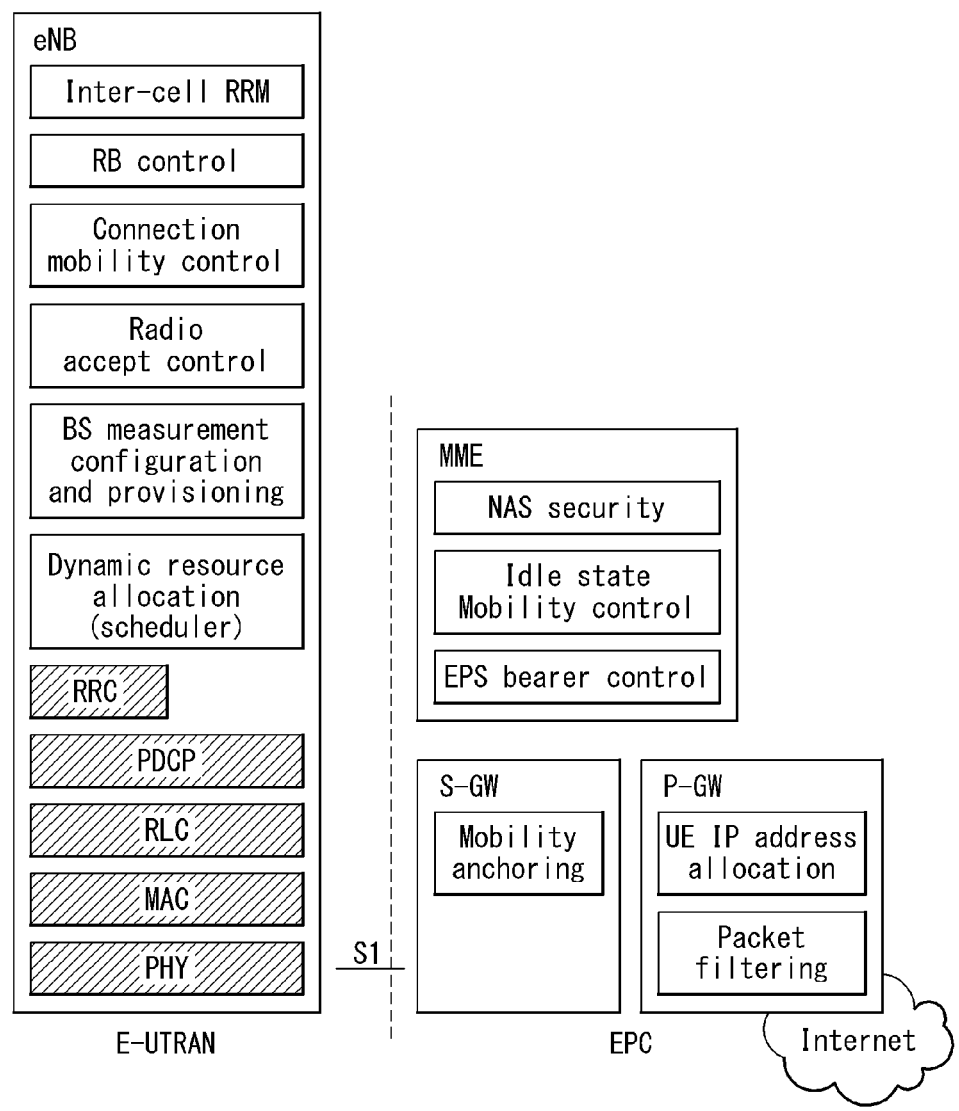

[FIG. 4]
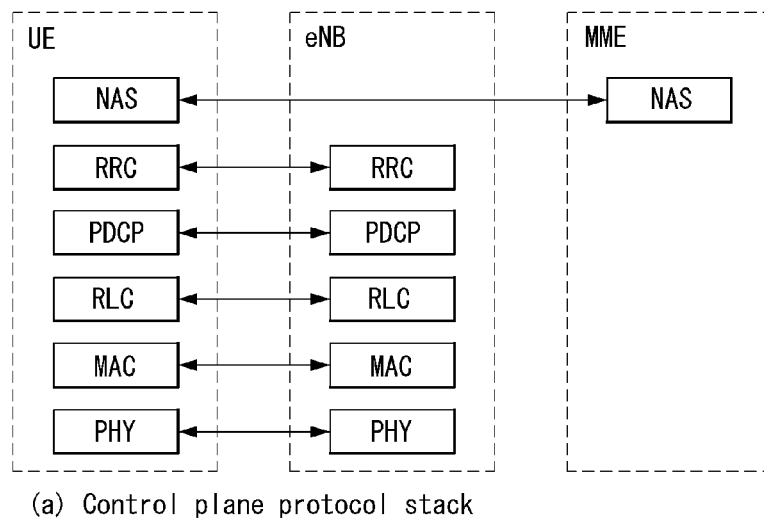
(a) Control plane protocol stack
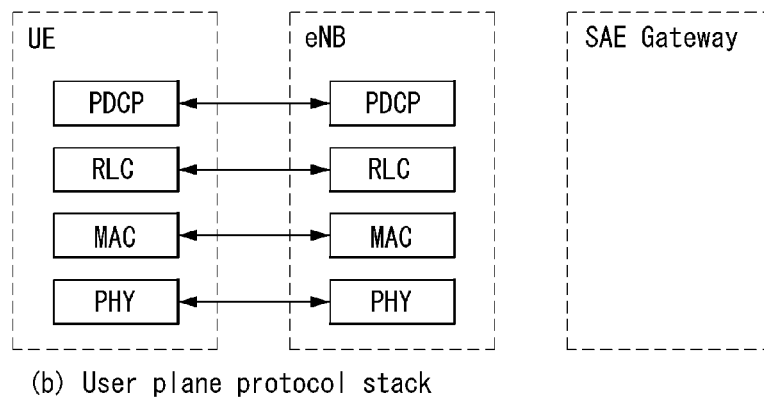
(b) User plane protocol stack

[FIG. 5]
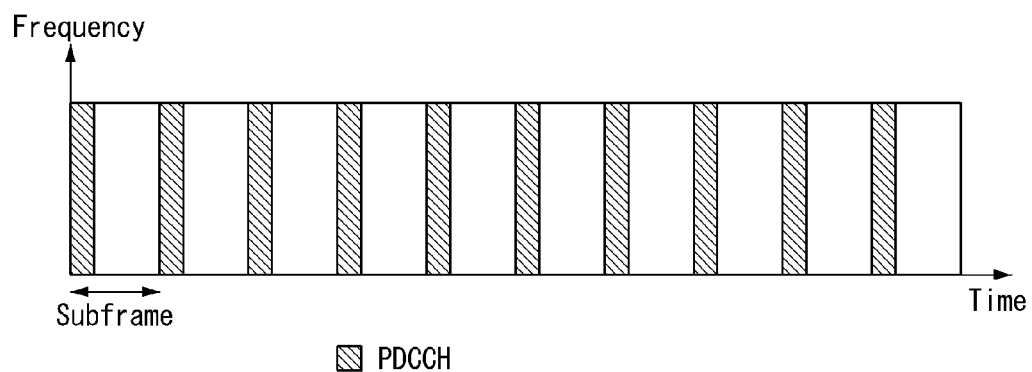
[FIG. 6]
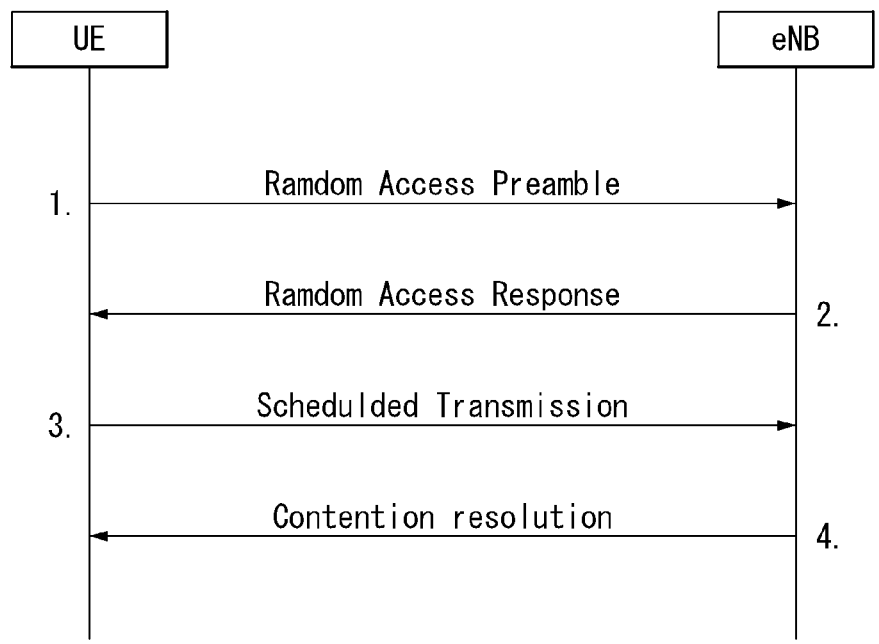

[FIG. 7]
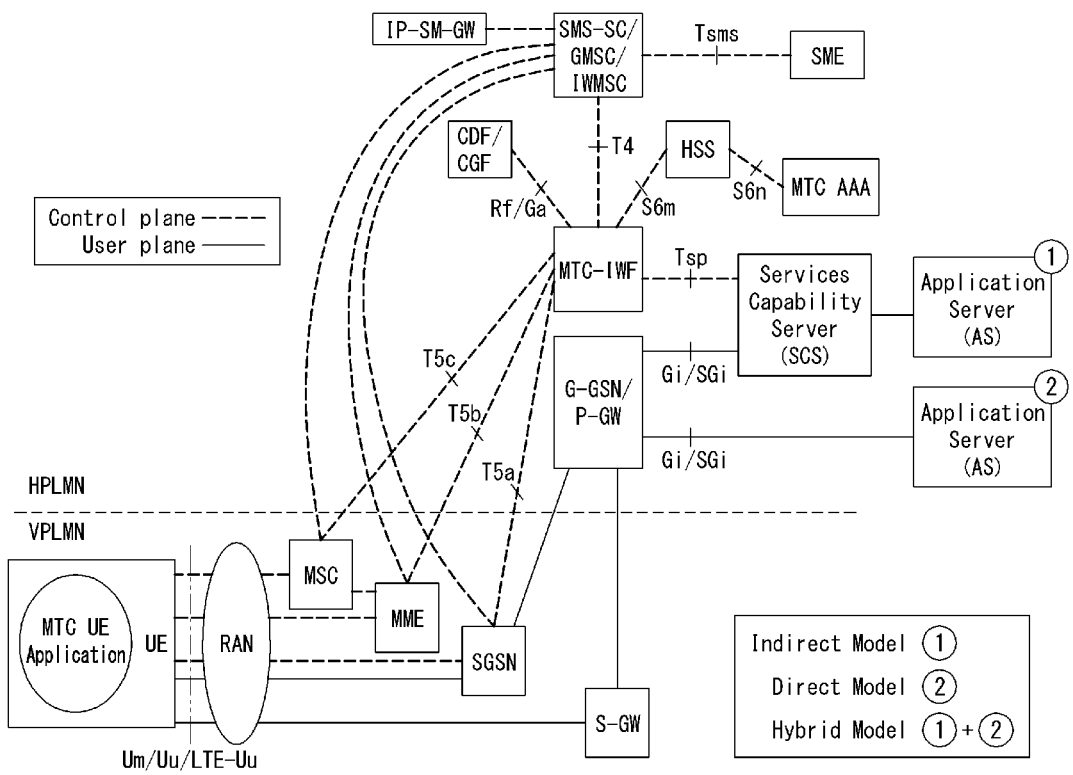

[FIG. 8]
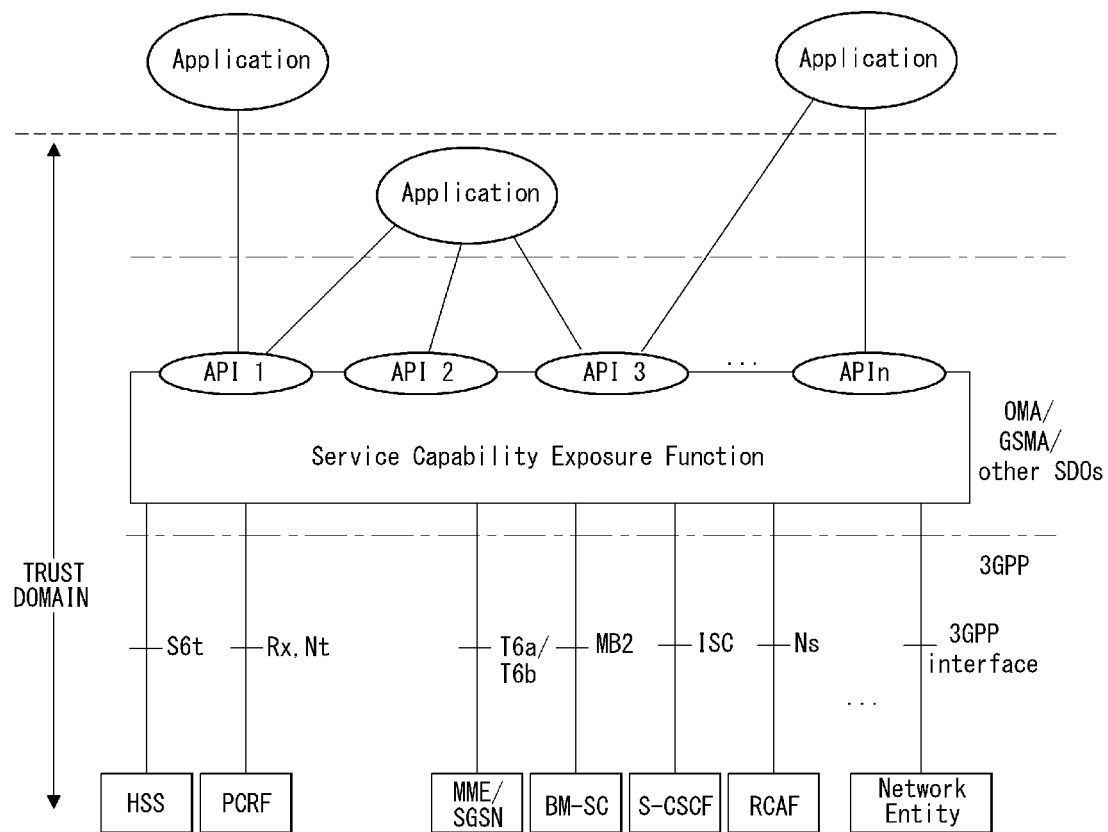

[FIG. 9]
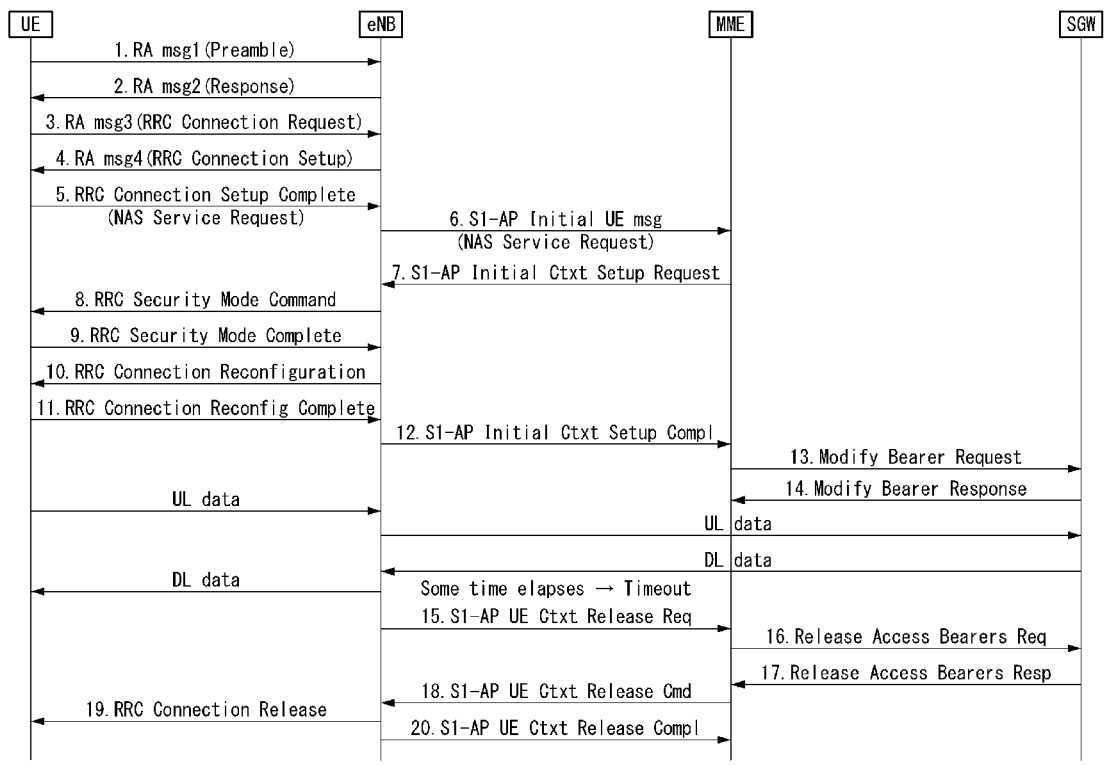

[FIG. 10]
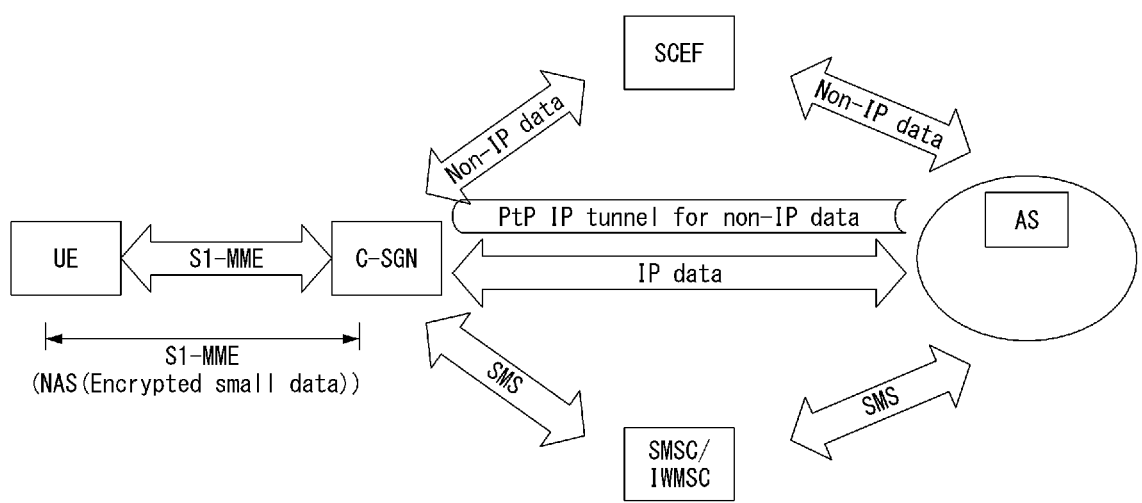

[FIG. 11]
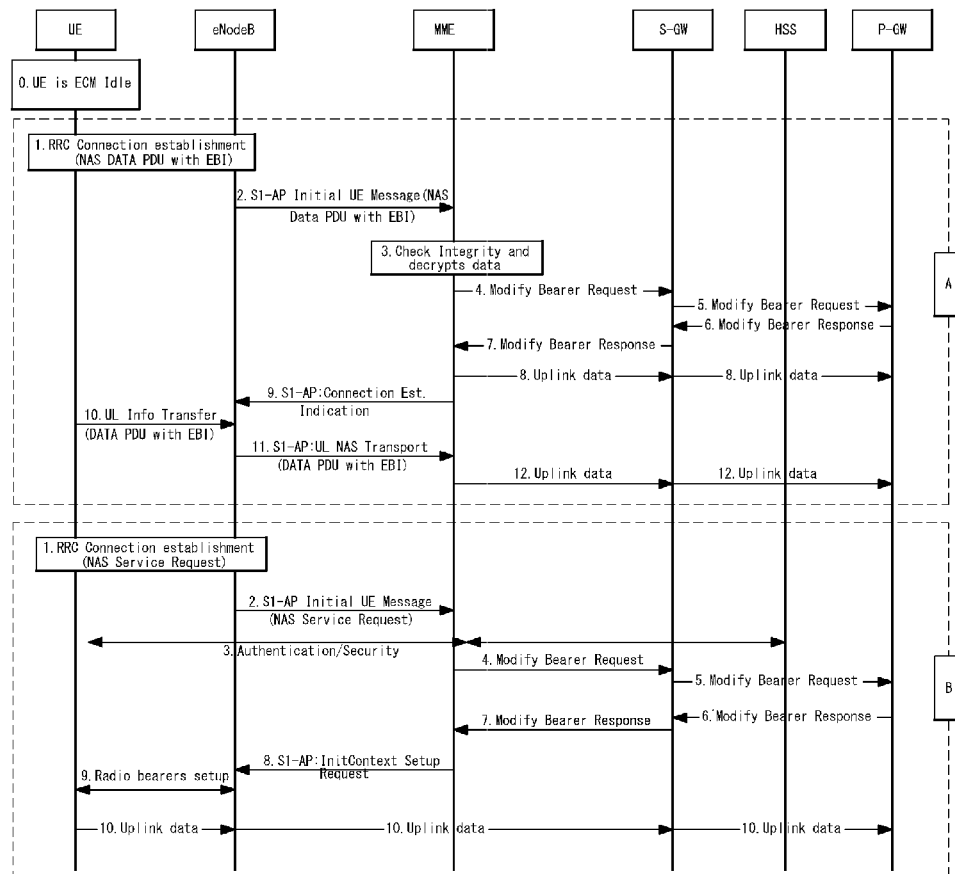

[FIG. 12]
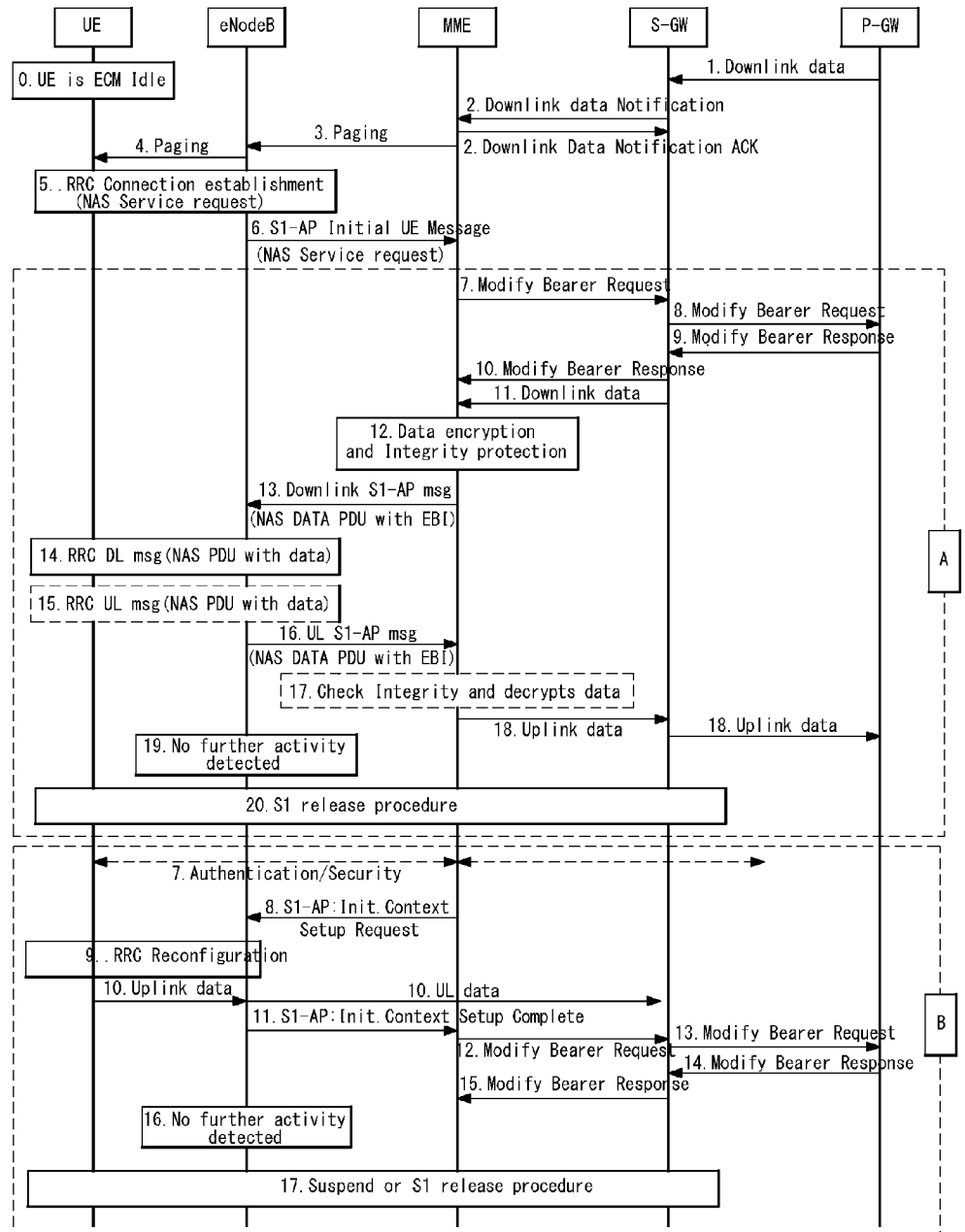

[FIG. 13]
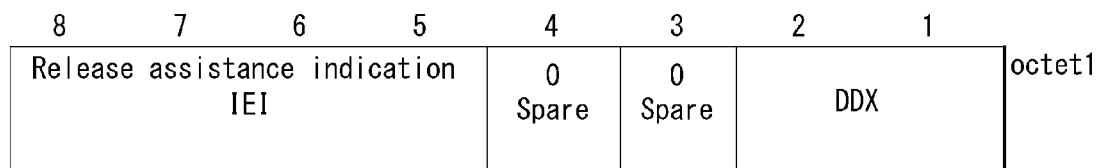

[FIG. 14]
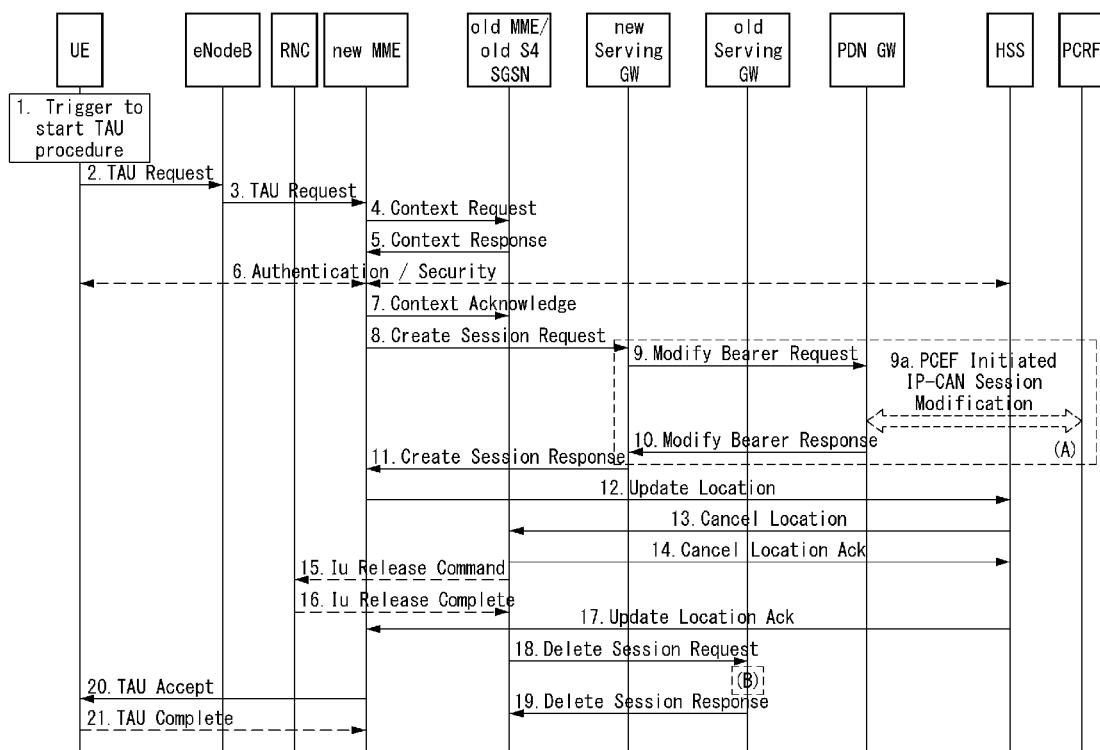

[FIG. 15]
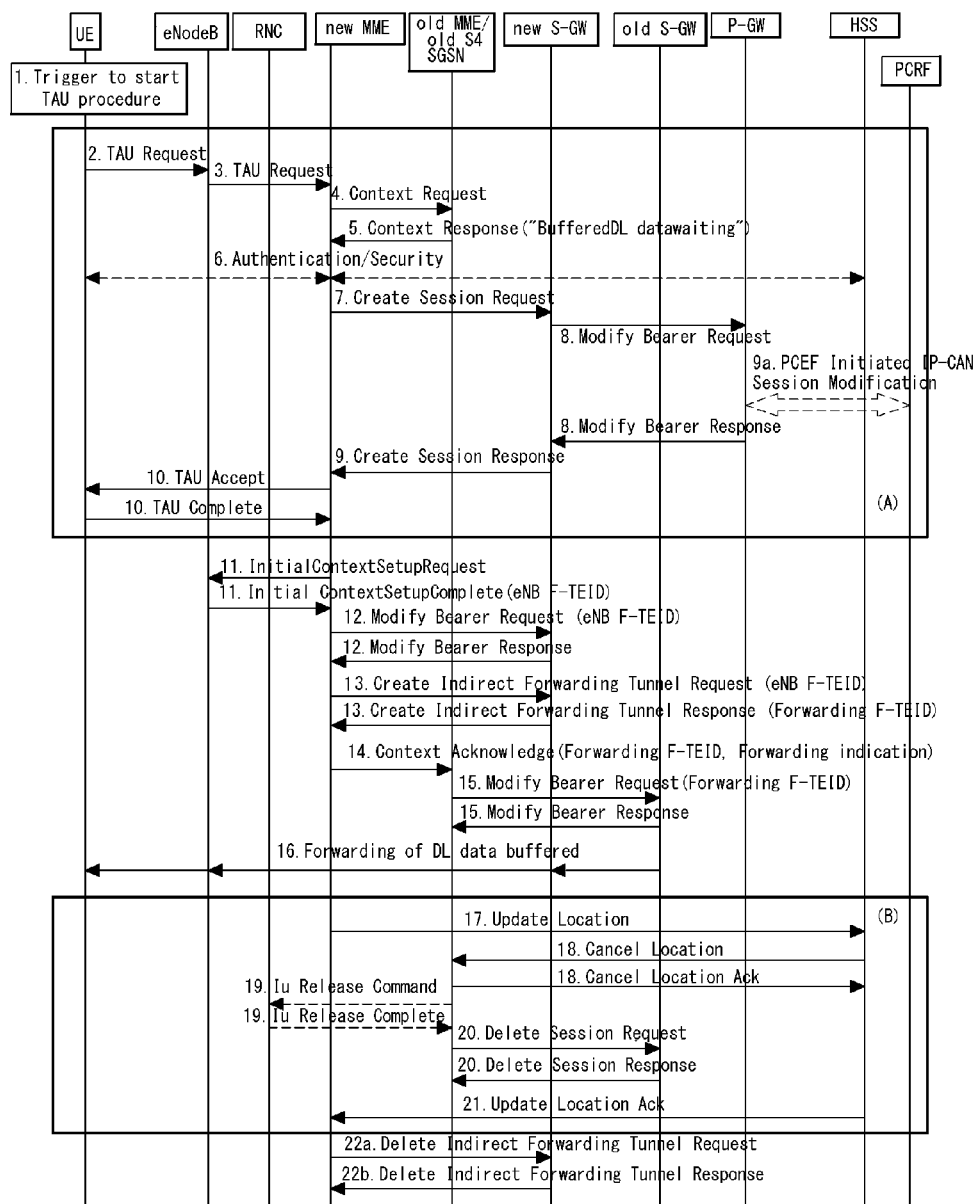

[FIG. 16]
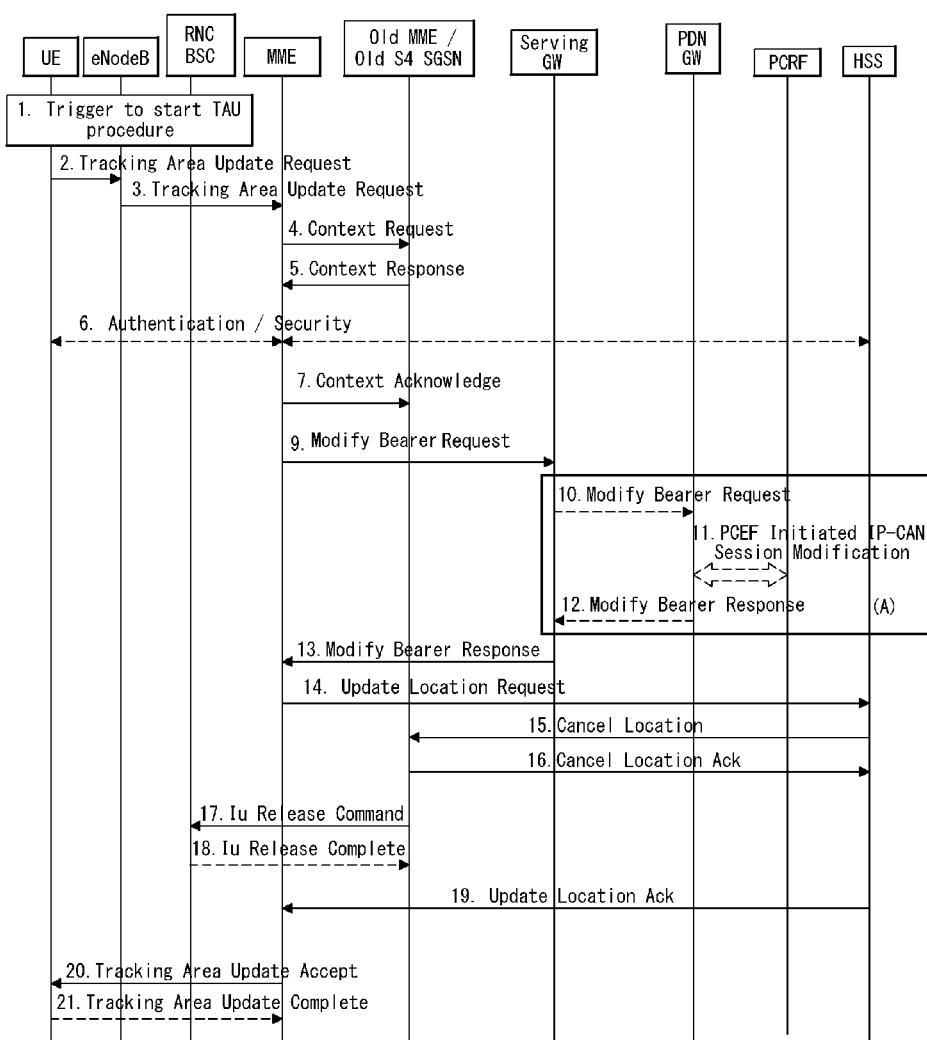

[FIG. 17]
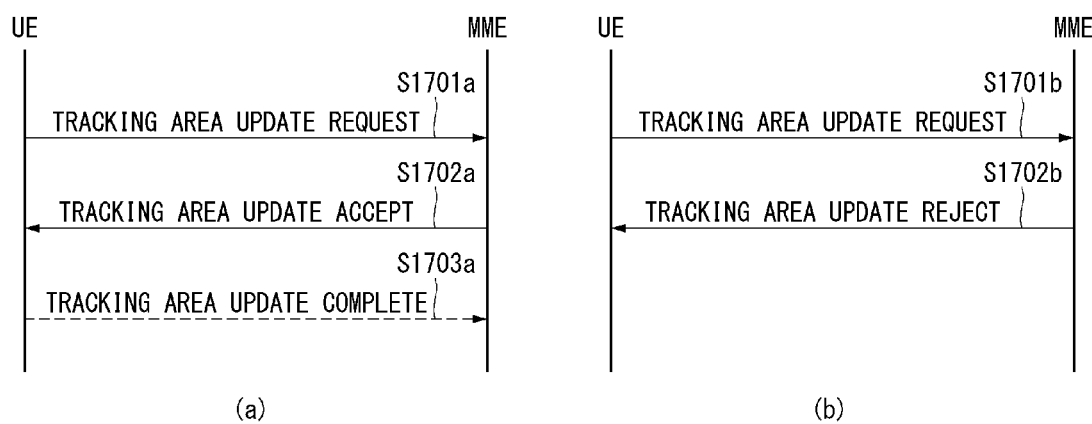

[FIG. 18]
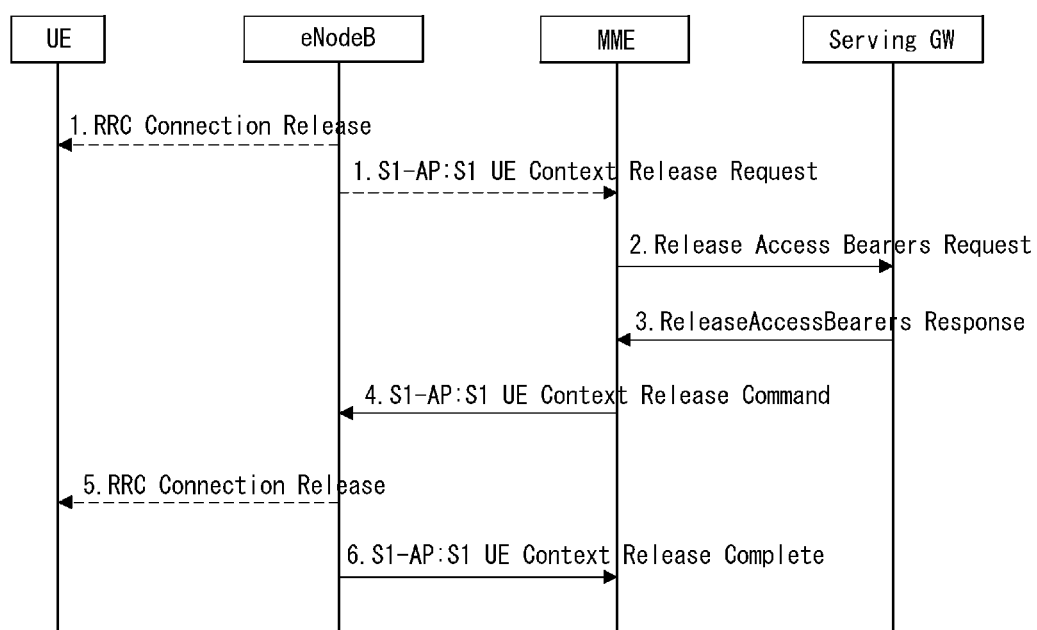

[FIG. 19]
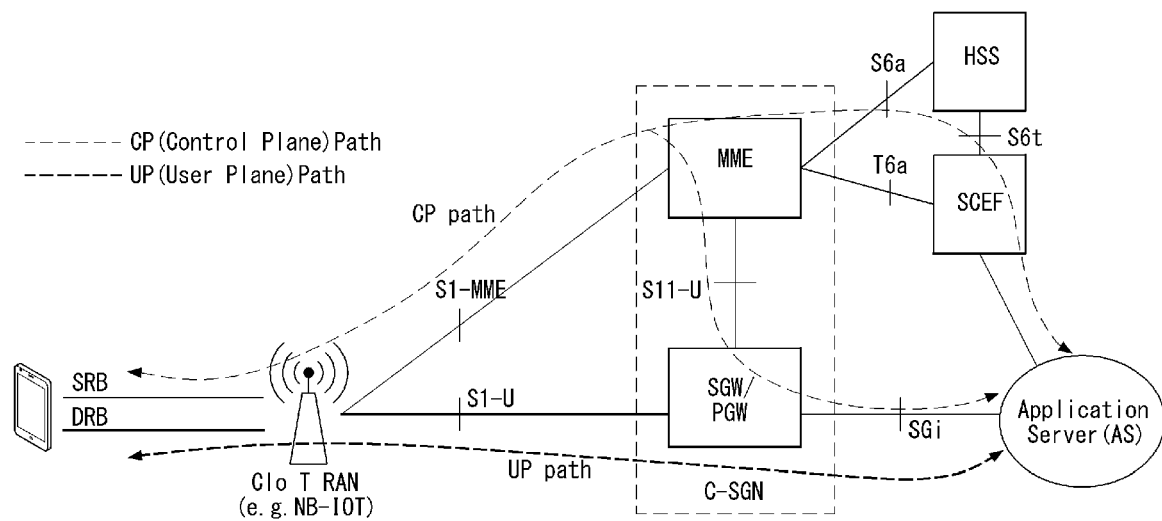

[FIG. 20]
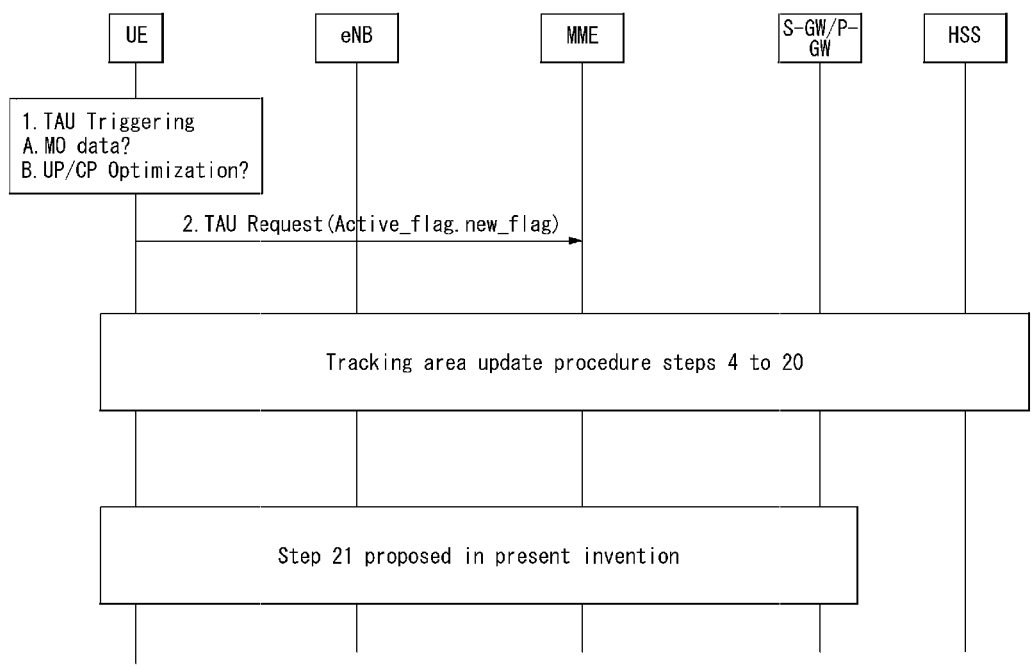

[FIG. 21]
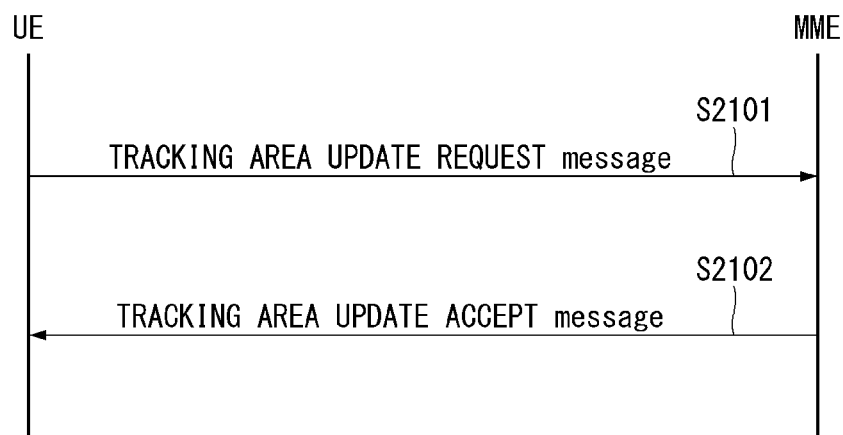

[FIG. 22]
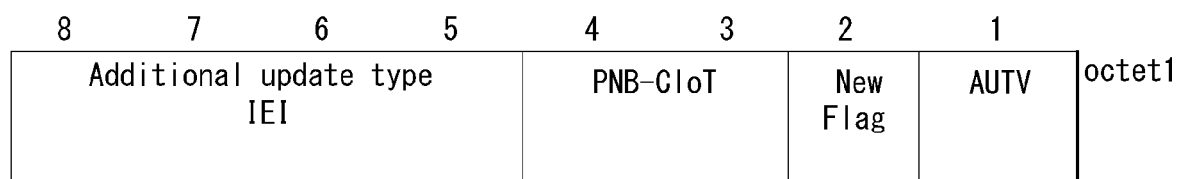

[FIG. 23]

[FIG. 24]
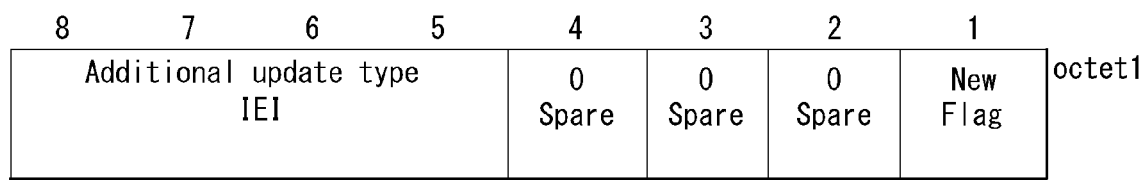

[FIG. 25]
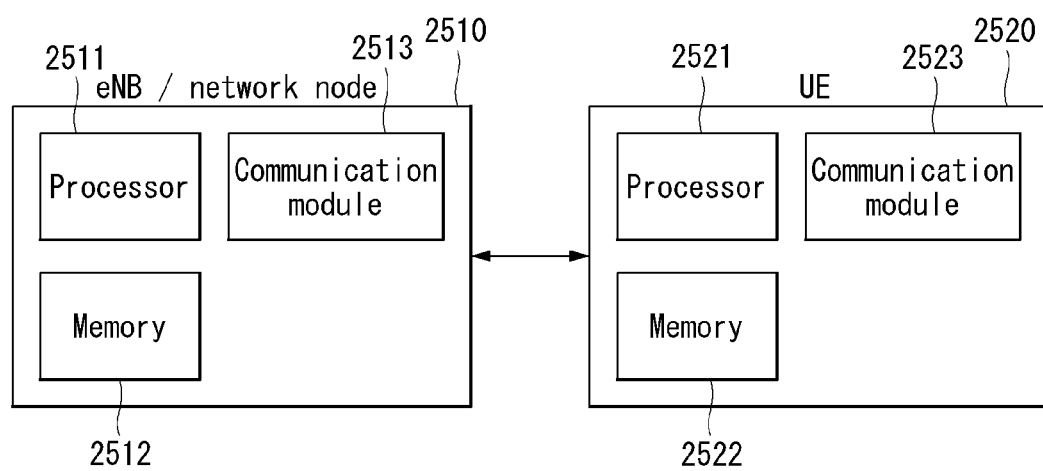

[FIG. 26]
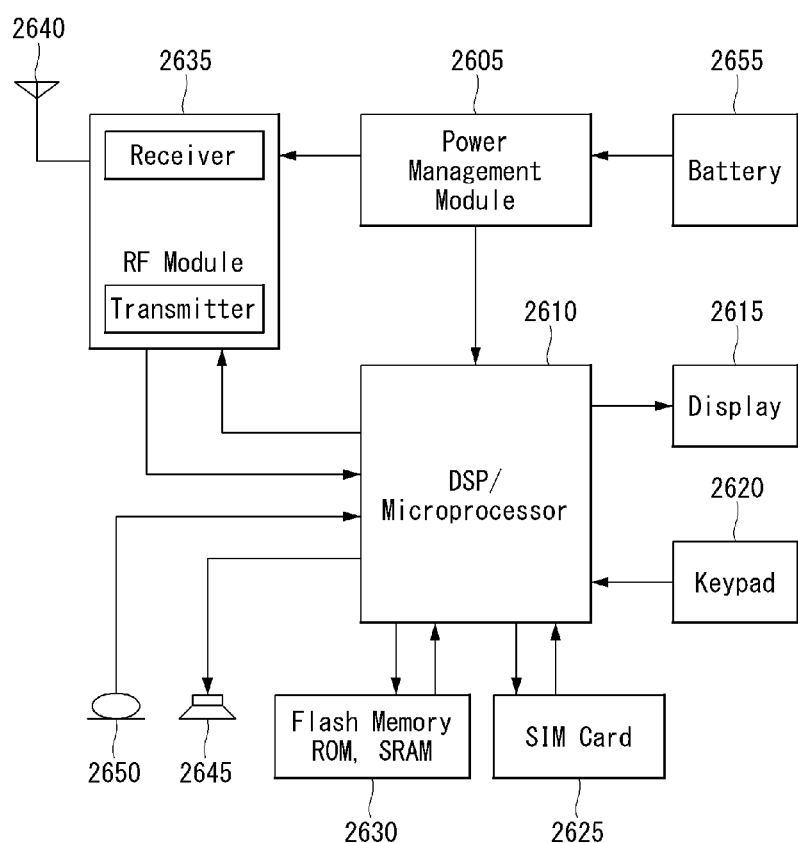

METHOD FOR TRACKING AREA UPDATE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/003157, filed on Mar. 23, 2017, which claims the benefit of U.S. Provisional Application No. 62/311,927, filed on Mar. 23, 2016, 62/313,109, filed on Mar. 24, 2016, 62/320,665, filed on Apr. 11, 2016, 62/325,985, filed on Apr. 21, 2016, 62/331,453, filed on May 4, 2016, and 62/333,820, filed on May 9, 2016, the contents of which are all hereby incorporated by reference herein in their entireties.

TECHNICAL FIELD

The present invention relates to a wireless communication system, and more particularly, to a method for performing or supporting a tracking update procedure and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An embodiment of the present invention provides a method for tracking area update for efficient data transmission in a case where a UE has data to be transmitted when the UE starts a tracking area update procedure.

Furthermore, an embodiment of the present invention provides a method for maintaining a signaling connection between the UE and an MME after the tracking area update procedure when a previous state of the UE is suspension.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing, by a user equipment (UE), a tracking area update (TAU) procedure in a wireless communication system includes: transmitting a TAU request message to a mobility management entity (MME); and receiving a TAU accept message from the MME, in which when the UE uses signaling optimization to enable the delivery of user data through a control plane via the MME, and the UE does not have pending user data to be transmitted through a user plane and has pending user data to be transmitted through the control plane via the MME, then a first active flag may be set in the TAU request message.

Preferably, the first active flag may indicate a request for maintaining a non-access stratum (NAS) signaling connection between the UE and the MME after completion of the TAU procedure.

Preferably, the first active flag may be included in an additional update type information element for providing additional information regarding a type of a request for the TAU procedure in the TAU request message.

Preferably, when a value of the first active flag is '0', the non-access stratum (NAS) signaling connection between the UE and the MME may not be maintained after the completion of the TAU procedure.

Preferably, when a value of the first active flag is '1', the non-access stratum (NAS) signaling connection between the UE and the MME may be maintained after the completion of the TAU procedure.

Preferably, the method may further include determining whether to drive a predetermined timer according to whether the first active flag in the TAU request message is set when the TAU accept message is received.

Preferably, when the first active flag in the TAU request message is not set, the timer starts and when the timer expires, the non-access stratum (NAS) signaling connection between the UE and the MME may be released by the UE.

Preferably, in a case where the UE does not successfully perform the TAU procedure and a mobility management (MM) back-off timer is driven, the TAU request may be transmitted when the UE receives a paging.

Preferably, when the UE has the pending user data through the user plane, a second active flag may be set in the TAU request message.

In another aspect of the present invention, a method for performing, by a mobility management entity (MME), a tracking area update (TAU) procedure in a wireless communication system includes: receiving a TAU request message from a user equipment (UE); and transmitting a TAU accept message from the UE, in which when a first active flag is set in the TAU request message, a non-access stratum (NAS) signaling connection between the UE and the MME may not be released after completion of the TAU procedure, and the first active flag may indicate a request for maintaining the non-access stratum (NAS) signaling connection between the UE and the MME after the completion of the TAU procedure.

Preferably, when the first active flag is not set in the TAU request, the non-access stratum (NAS) signaling connection may be released.

Preferably, first active flag may be included in an additional update type information element for providing additional information regarding a type of a request for the TAU procedure in the TAU request message.

Preferably, when a value of the first active flag is '0', the non-access stratum (NAS) signaling connection between the UE and the MME may not be maintained after the completion of the TAU procedure.

Preferably, when a value of the first active flag is '1', the non-access stratum (NAS) signaling connection between the UE and the MME may be maintained after the completion of the TAU procedure.

Advantageous Effects

According to an embodiment of the present invention, a UE which uses control plane cellular Internet of things (CIoT) evolved packet system (EPS) optimization may efficiently transmit user data via a control plane after a tracking area update is completed.

Furthermore, according to an embodiment of the present invention, a UE which uses user plane CIoT EPS optimization may efficiently transmit the user data via a user plane after the tracking area update is completed.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 is a diagram schematically showing a structure of a physical channel in a wireless communication system to which the present invention may be applied.

FIG. 6 is a diagram for describing a contention based random access procedure in a wireless communication system to which the present invention may be applied.

FIG. 7 is a diagram illustrating a MTC (Machine-Type Communication) architecture in a wireless communication system to which the present invention may be applied.

FIG. 8 a diagram illustrating an architecture for service capability exposure in a wireless communication system to which the present invention may be applied.

FIG. 9 illustrates a legacy RRC connection procedure in a wireless communication system to which the present invention may be applied.

FIG. 10 is a diagram illustrating an end to end small data flow in a wireless communication system to which the present invention may be applied.

FIG. 11 is a diagram illustrating CP CIoT EPS optimization and UP CIoT EPS optimization for mobile originated data in a wireless communication system to which the present invention may be applied.

FIG. 12 is a diagram illustrating CP CIoT EPS optimization and UP CIoT EPS optimization for mobile terminated data in a wireless communication system to which the present invention may be applied.

FIG. 13 is a diagram illustrating a release assistance indication/information information element in a wireless communication system to which the present invention may be applied.

FIG. 14 illustrates a tracking area update procedure in a wireless communication system to which the present invention may be applied.

FIG. 15 illustrates a tracking area update procedure in a wireless communication system to which the present invention may be applied.

FIG. 16 illustrates a tracking area update procedure in a wireless communication system to which the present invention may be applied.

FIG. 17 illustrates a tracking area update procedure in a wireless communication system to which the present invention may be applied.

FIG. 18 is a diagram illustrating an S1 release procedure in a wireless communication system to which the present invention may be applied.

FIG. 19 is a diagram illustrating control plane optimization and user plane optimization in a wireless communication system to which the present invention may be applied.

FIG. 20 illustrates a tracking area update procedure according to an embodiment of the present invention.

FIG. 21 illustrates a tracking area update procedure according to an embodiment of the present invention.

FIG. 22 is a diagram illustrating an additional update type information element according to an embodiment of the present invention.

FIG. 23 is a diagram illustrating an EPS update type information element according to an embodiment of the present invention.

FIG. 24 is a diagram illustrating a new indication information element for connection release according to an embodiment of the present invention.

FIG. 25 illustrates a block diagram of a communication apparatus according to an embodiment of the present invention.

FIG. 26 illustrates a block diagram of a wireless communication apparatus according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.
Universal Mobile Telecommunication System (UMTS): the 3rd generation mobile communication technology based on GSM, developed by the 3GPP
Evolved Packet System (EPS): a network system comprising an Evolved Packet Core (EPC), a packet switched core network based on the Internet Protocol (IP) and an access network such as the LTE and UTRAN. The EPS is a network evolved from the UMTS.
NodeB: the base station of the UMTS network. NodeB is installed outside and provides coverage of a macro cell.
eNodeB: the base station of the EPS network. eNodeB is installed outside and provides coverage of a macro cell.
User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.
IP Multimedia Subsystem (IMS): a sub-system providing multimedia services based on the IP
International Mobile Subscriber Identity (IMSI): a globally unique subscriber identifier assigned in a mobile communication network
Machine Type Communication (MTC): communication performed by machines without human intervention. It may be called Machine-to-Machine (M2M) communication.
MTC terminal (MTC UE or MTC device): a terminal (for example, a vending machine, meter, and so on) equipped with a communication function operating through a mobile communication network (For example, communicating with an MTC server via a PLMN) and performing an MTC function
MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.
(MTC) application: services (to which MTC is applied) (for example, remote metering, traffic movement tracking, weather observation sensors, and so on)
(MTC) Application Server: a server on a network in which (MTC) applications are performed
MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.
MTC User (MTC User): The MTC user uses the service provided by the MTC server.
MTC subscriber: an entity having a connection relationship with a network operator and providing services to one or more MTC terminals.
MTC group: an MTC group shares at least one or more MTC features and denotes a group of MTC terminals belonging to MTC subscribers.
Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.
External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator)

provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, reconfiguration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

MTC (Machine-Type Communication)

FIG. 7 is a diagram illustrating a MTC (Machine-Type Communication) architecture in a wireless communication system to which the present invention may be applied.

An end-to-end application between the UE (or MTC terminal) used for the MTC and the MTC application can utilize the services provided in the 3GPP system and the optional services provided to the MTC server. The 3GPP system can provide transport and communication services (including 3GPP bearer services, IMS and Short Message Service (SMS)) including various optimizations which facilitate the MTC.

Referring to FIG. 7, the UE used for MTC is connected to a 3GPP network (UTRAN, E-UTRAN, GERAN, I-WLAN, etc.) through the Um/Uu/LTE-Uu interface. The architecture of FIG. 7 includes various MTC models (Direct, Indirect, Hybrid).

First, the entities shown in FIG. 7 will be described.

In FIG. 7, the application server is a server on the network where the MTC application is executed. The technologies for implementing various above-described MTC applications can be applied to the MTC application server, and the detailed description thereof will be omitted here. In FIG. 7, the MTC application server can access the MTC server through the reference point API, and the detailed description thereof will be omitted here. Alternatively, the MTC application server may be collocated with the MTC server.

The MTC server (for example, the SCS server in FIG. 7) is a server on the network that manages the MTC UE and can communicate with UEs and PLMN nodes which are connected to the 3GPP network and used for the MTC.

The MTC-IWF (MTC-InterWorking Function) may manage the interworking between the MTC server and the operator core network, and play the role of a proxy for the MTC operation. In order to support the MTC indirect or hybrid model, the MTC-IWF can relay or interpret the signaling protocol on the reference point Tsp to operate certain functions in the PLMN. The MTC-IWF may perform a function of authenticating the MTC server before establishing communication with the 3GPP network, a function of authenticating the control plane request from the MTC server, various functions related to the trigger instruction described later, etc.

Short Message Service-Service Center (SMS-SC)/Internet Protocol Short Message GateWay (IP-SM-GW) can manage transmission and reception of short message service (SMS). The SMS-SC may be responsible for relaying, storing, and delivering short messages between a Short Message Entity (SME) (the entity transmitting or receiving short messages) and the UE. The IP-SM-GW can be in charge of protocol interoperability between the IP-based UE and the SMS-SC.

Charging Data Function (CDF)/Charging Gateway Function (CGF) can perform charging-related operations.

The HLR/HSS can store subscriber information (IMSI, etc.), routing information, setting information, and provide the MTC-IWF with the stored information.

The MSC/SGSN/MME may perform control functions such as mobility management, authentication and resource allocation for network connection of the UE. The MSC/SGSN/MME may perform a function of receiving a trigger instruction from the MTC-IWF in connection with the triggering to be described later and processing the instruction in the form of a message to be provided to the MTC UE.

The Gateway GPRS Support Node (GGSN)/Serving-Gateway (S-GW)+Packet Date Network-Gateway (P-GW) can function as a gateway which is in charge of connection between the core network and the external network.

Table 2 summarizes the main reference points in FIG. 7.

TABLE 2

| Reference point | Description |
|---|---|
| Tsms | A reference point used by an entity outside the 3GPP system to communicate with the MTC UE via SMS |
| Tsp | A reference point used by an entity outside the 3GPP system to communicate with the MTC-IWF in connection with control plane signaling |
| T4 | A reference point used by the MTC-IWF to route the device trigger to the SMS-SC of the HPLMN |
| T5a | A reference point between the MTC-IWF and the serving SGSN |
| T5b | A reference point between the MTC-IWF and the serving MME |
| T5c | A reference point between the MTC-IWF and the serving MSC |
| S6m | A reference point used by the MTC-IWF to inquire the UE's identification information (E.164 Mobile Station International Subscriber Directory Number (MSISDN) or IMSI mapped to an external identifier) and to collect UE accessibility and setting information |

In Table 2, one or more of the reference points T5a, T5b, and T5c is referred to as T5.

On the other hand, user plane communication with the MTC server in the case of the indirect and hybrid models and communication with the MTC application server in the case of the direct and hybrid models can be performed using the existing protocol through the reference points Gi and SGi.

Specific details relating to the contents described with reference to FIG. 7 can be incorporated into this document by referring to the 3GPP TS 23.682 document.

FIG. 8 is a diagram illustrating an architecture for the service capability exposure in a wireless communication system to which the present invention may be applied.

The architecture for the service capability exposure illustrated in FIG. 8 allows the 3GPP network to securely expose its services and capabilities provided by the 3GPP network interface to an external third party service provider application.

The Service Capability Exposure Function (SCEF) is a core entity within the 3GPP architecture for service capability exposure that provides a means for securely exposing services and capabilities provided by 3GPP network interfaces. In other words, the SCEF is a core entity for providing service functions belonging to a trust domain operated by a mobile communication provider. The SCEF provides API interfaces to third party service providers and provides 3GPP service functions to the third party service providers through connections with various entities of the 3GPP. The SCEF function may also be provided by the SCS.

If the Tsp function can be exposed through an application program interface (API), the MTC-IWF can be co-located with the SCEF. A protocol (e.g., DIAMETER, RESTful APIs, XML over HTTP, etc.) for specifying a new 3GPP interface depending on multiple factors is selected. Here, the multiple factors may include easiness of exposure of requested information or the need of a specific interface, but the present invention is not limited to these examples.

The SCEF is an entity that belongs to the Trust Domain and can be operated by a cellular operator or by a third party that has a trusted relationship. As a node for service architecture exposure performed under work items such as MONTE (Monitoring Enhancement) and AESE (Architecture Enhancements for Service Capability Exposure) of 3GPP Release 13, the SCEF is connected to 3GPP entities which is to provide services as in FIG. 8 to thereby provide external third parties with various functions related to monitoring and charging fees and set the communication pattern of the third party providers to the inside of EPS.

RRC Connection Setup Procedure

FIG. 9 illustrates a legacy RRC connection procedure in a wireless communication system to which the present invention may be applied.

FIG. 9 illustrates a current S1/EPS architecture based procedure (i.e., an applicable procedure at transition of a UE idle/connection state) required to establish and tear down a connection so that the UE may transmit/receive a user plane.

1. The UE transmits a random access (RA) first message (Msg 1) (i.e., a preamble) to the eNB.

2. The eNB sends an RA second message (Msg 2) (i.e., a random access response) to the UE.

3. The UE sends an RA third message (Msg 3) to the eNB.

In this case, in the case of initial connection of the UE, an RRC connection request for requesting RRC connection may be included in the RA Msg 3 and transmitted.

The RRC connection request message includes a UE identity (e.g., SAE temporary mobile subscriber identity (S-TMSI) or random ID) and an establishment cause.

The RRC establishment cause is determined according to an NAS procedure (e.g., attach, detach, tracking area update, service request, and extended service request).

4. The eNB transmits an RA fourth message (Msg 4) to the UE.

In this case, the eNB may transmit to the UE an RRC connection setup message in the RA Msg 4 in response to the RRC connection request message.

After receiving the RRC connection setup message, the UE transitions to the RRC_CONNECTED state.

5. The UE transmits to the network THE RRC connection setup complete message to the eNB in order to verify successful completion of RRC connection establishment.

In this case, the UE may transmit the RRC connection setup complete message including an NAS message (for example, an initial attach message, a service request message (in the case of FIG. 9), etc.) to the eNB.

6. The eNB acquires a service request message from the RRC connection setup complete message and delivers the acquired service request message to the MME through an S1AP initial UE Message.

The initial UE message includes a NAS message (e.g., the service request message), a tracking area identity (TAI) and an E-UTRAN cell global identifier (ECGI) of the serving cell, S-TMSI, a closed subscriber group (CSG) identifier (ID), a CSG access mode, and an RRC establishment cause.

7. The MME transmits an S1-AP initial context setup request message to the eNB.

The initial context setup request message includes an S-GW address, an S1-tunnel endpoint identifier (TEID), an EPS Bearer QoS(s), a security Context, an MME signaling connection Id, a handover restriction list, and a CSG membership indication.

8. The eNB transmits an RRC security mode command message containing the selected access stratum (AS) algorithm to the UE.

The RRC security mode command message is integrity protected with an RRC integrity key based on a current access security management entity key (i.e., K_ASME).

9. The UE transmits an RRC security mode complete message to the eNB.

The RRC security mode complete is integrity protected with the selected algorithm indicated in the RRC security mode command message and the K_ASME based RRC integrity key.

10. The eNB transmits an RRC configuration reconfiguration message to the UE in order to establish the radio bearer.

11. The UE transmits to the eNB an RRC connection reconfiguration complete message in response to the RRC connection reconfiguration message in order to verify successful completion of radio bearer establishment.

After this step, uplink data may be delivered to the S-GW from the UE by the eNB. The eNB may transmit the uplink data provided in step 7 above to the S-GW address and the TEID.

12. The eNB transmits the S1-AP initial context setup complete message to the MME.

The initial context setup complete message includes an ENB address, a list of accepted EPS bearers, a list of rejected EPS bearers, and S1 TEID(s) (DL).

13. The MME transmits a modify bearer request message to the S-GW for each PDN connection.

The modify bearer request message includes the eNB address, S1 TEID(s) (DL) for the accepted EPS bearer, a delay downlink packet notification request, an RAT type, and the like.

14. The S-GW transmits a modify bearer response message to the MME in response to the modify bearer request.

The modify bearer response message includes the S-GW address and the TEID for uplink traffic.

After this step, downlink data may be delivered to UE from the S-GW by the eNB.

Meanwhile, for example, when a user inactivity is detected until a predetermined time elapses after a predetermined time has elapsed, an S1 release procedure may be performed.

15. When the eNB detects that the signaling connection of the UE and all radio bearers for the UE need to be released, the eNB transmits a S1-AP UE context release request message to the MME.

The UE context release request message includes a cause and the cause indicates a release cause (e.g., the user inactivity, etc.).

16. The MME transmits a release access bearers request message to the S-GW in order to request the release of all S1-U bearers for the UE.

17. When the S-GW receives the release access bearers request message, all ENB related information (i.e., address and TEID(s)) for the corresponding UE is released and a release access bearers response message is responded to the MME.

18. The MME releases S1 by transmitting an S1-AP UE context release command message to the eNB.

19. The eNB transmits the RRC connection release message to the UE. When the message is acknowledged by the UE, the eNB deletes the context of the UE.

20. The eNB acknowledges the release of the S by transmitting the S1-AP UE context release command message to the MME.

Efficient Small Data Transmission for Narrowband Internet of Things (IOT)

In 3GPP, an architecture for a new core network for the efficient small data transmission is discussed in order to support narrowband Internet of things (NB-IoT).

FIG. 10 is a diagram illustrating an end to end small data flow in a wireless communication system to which the present invention may be applied.

As illustrated in FIG. 10, transmission and reception of non-Internet protocol (IP) may be performed by a point-to-point tunnel scheme between the AS and a CIoT serving gateway node (C-SGN). The C-SGN may be an integrated node including a main function of the MME and a main function of the S-GW in order to efficiently support the CIoT.

Alternatively, an SCEF framework may be used in order to transmit and receive a non-IP packet. In other words, the transmission and reception of the non-IP data may be performed via the SCEF between the AS/SCS and the C-SGN.

In addition, the transmission and reception of the non-IP data may be performed between the C-SGN and the UE through an S1-MME reference point. That is, small data (e.g., non-IP data) encrypted by the NAS layer may be transmitted and received between the UE and the C-SGN.

The C-SGN is a new logical entity and may be implemented to support only an essential function required for a CIoT use case as follows.

Some procedures required in a mobility management (MM) procedure;
Efficient small data procedure;
Security procedure required for efficient small data;
SMS on a PS domain using a non-combined GPRS attach procedure when a short message service (SMS) support is required;
Paging optimization for coverage enhancement;
Termination of an SGi interface for a non-roaming case;
Supporting an S8 interface for a roaming case;
Supporting an attach (that is, an attach for SMS transmission and reception without the PDN connection for the IP (or non-IP) data) procedure for only the SMS;
Supporting tunneling on SGi for the non-IP data.

As described above, a solution for small data transmission using the SCEF is discussed in the 3GPP and for NB-IOT, the following conclusion is reached.

For infrequent small data transmission (IP data, non-IP data, and SMS), a solution for supporting data transmission and reception through an NAS PDU via a signaling radio bearer (SRB) between the UE and the network based on the architecture illustrated in FIG. 10 above is mandatorily applied.

A solution may be optionally applied, which requires data transmission and reception through a data radio bearer (DRB) (S1-U), but caches AS parameters in the eNB even when the UE is switched from a connected state to an idle state.

The present invention may be applied even to the C-SGN defined as a new node and further, may be applied even to a form in which a CIoT function is added to the existing combination of the MME and the S-GW.

Cellular Internet of things (CIoT) EPS optimization is defined to efficiently serve a low complexity UE such as NB-IoT and LTE MTC. That is, the CIoT EPS optimization provides an enhanced support for the small data transmission.

At present, control plane (CP) CIoT EPS optimization or CIoT EPS CP Optimization and CIoT EPS user plane (UP) optimization or CIoT EPS UP optimization to transmit data to the SRB are defined and the same UE may support both two different data transmission modes.

The CP CIoT EPS optimization supports efficient delivery of the user data (IP, non-IP, or SMS) through the control plane via the MME without triggering establishment of the data radio bearer. Optionally, header compression of the IP data may be applied to IP PDN type PDN connection configured to support the header compression.

The UP CIoT EPS optimization supports a change from an EMM-idle mode to an EMM-connected mode without using the service request procedure.

During the attach or tracking area update (TAU) of the UE, a capability (that is, CIoT EPS optimization supported by the UE and/or MME) for the CIoT EPS optimization may be negotiated with the MME. In other words, the UE that supports the CIoT EPS optimization may indicate a CIoT network operation which the UE may support and prefer to use during the attach or TAU procedure.

For example, when the UE supports both two types of CIoT EPS optimizations, the MME may also approve the PDN connection in which two CIoT EPS optimizations are available. As one example, in the case of a PDN connection requiring data transmission/reception with the SCEF, the MME may transmit an instruction to the UE to communicate with the CP only (that is, using the CP CIoT EPS optimization only). In this case, the UE may select a transmission format by an application requiring current mobile originated (MO) transmission and a policy of a corresponding access point name (APN).

The UE may request an appropriate data transmission format (i.e., CP CIoT EPS optimization or UP CIoT EPS optimization) for RRC connection switching as follows.

FIG. 11 is a diagram illustrating CP CIoT EPS optimization and UP CIoT EPS optimization for mobile originated data in a wireless communication system to which the present invention may be applied.

0. The UE is in EPS connection management (ECM)-idle.

First, when the CP CIoT EPS optimization is used (A), a transmission procedure of the uplink data will be described.

1. The UE establishes the RRC connection and transmits the NAS PDU integrity protected as a part of the establishment of the RRC connection to the eNB. The NAS PDU carries the EPS bearer ID and the encrypted uplink data.

2. The NAS PDU transmitted in step 1 above is relayed to the MME by using the S1-AP initial UE message by the eNB.

3. The MME checks integrity of the received NAS PDU and decrypts data included in the NAS PDU.

4. When S11-U connection is not established, the MME transmits the modify bearer request message to the S-GW for each PDN connection.

The modify bearer request message includes an MME address, MME TEID DL, a delay downlink packet notification request, the RAT type, and the like.

The S-GW may now transmit the downlink data to the UE.

5-6. The S-GW transmits the modify bearer response message to the P-GW and the P-GW transmits the modify bearer response message to the S-GW.

7. When the modify bearer request message is transmitted in step 4, the S-GW transmits the modify bearer response message to the MME in response to the modify bearer request message.

The modify bearer response message includes an S-GW address and a TEID for uplink traffic.

An S-GW address and an S-GW TEID for an S11-U user plane are used to deliver the uplink data to the S-GW by the MME.

8. The MME transmits the uplink data to the P-GW via the S-GW.

9. The MME may transmit a connection establishment indication message to the eNB.

10. The UE may transmit to the eNB an uplink (UL) information transfer message including the integrity protected NAS PDU.

11. The NAS PDU transmitted in step 10 may be relayed to the MME by using an S1-AP uplink transport message by the eNB.

12. The MME may transmit the uplink data to the P-GW via the S-GW.

Next, when the UP CIoT EPS optimization is used (B), the transmission procedure of the uplink data will be described.

1. The UE establishes the RRC connection and transmits a NAS service request message to the eNB as a part of the establishment of the RRC connection.

2. The eNB acquires the NAS service request message from the RRC connection setup complete message and delivers the acquired NAS service request message to the MME through the S1AP initial UE Message.

3. An NAS authentication/security procedure may be performed.

4. The MME transmits the modify bearer request message to the S-GW for each PDN connection.

The modify bearer request message includes the eNB address, the S1 TEID(s) (DL) for the accepted EPS bearer, the delay downlink packet notification request, the RAT type, and the like.

5-6. The S-GW transmits the modify bearer response message to the P-GW and the P-GW transmits the modify bearer response message to the S-GW.

7. The S-GW transmits a modify bearer response message to the MME in response to the modify bearer request.

The modify bearer response message includes the S-GW address and the TEID for the uplink traffic.

8. The MME transmits the S1-AP initial context setup request message to the eNB.

9. The radio bearer is set up between the UE and the eNB.

10. The uplink data is transferred from the UE to the S-GW by the eNB and transferred to the P-GW via the S-GW.

Further, the MME may also select a CIoT EPS optimization mode appropriate to the mobile terminated (MT) data as follows.

FIG. 12 is a diagram illustrating CP CIoT EPS optimization and UP CIoT EPS optimization for mobile terminated data in a wireless communication system to which the present invention may be applied.

0. The UE is attached to the EPS and is in the ECM-idle mode.

1. When the S-GW receives the downlink data packet/control signaling for the UE, the S-GW buffers the downlink data packet and identifies which MME serves the corresponding UE.

2. When the S-GW is buffering data in step 1, the S-GW transmits a downlink data notification message to the MME with control plane connectivity for the corresponding UE.

The downlink data notification message includes an allocation/retention priority (ARP) and the EPS bearer ID.

The MME responds to the S-GW with a downlink data notification Ack message.

3. When the UE is registered in the MME and it is determined that the UE is reachable, the MME transmits a paging message to each ENB which belongs to a tracking area(s) in which the UE is registered.

The paging message includes an NAS identifier (ID) for paging, TAI(s), a UE identity based discontinuous reception (DRX) index, a paging DRX length, a list of CSG ID(s) for paging, and a paging priority indication.

4. When the eNB receives the paging message from the MME, the UE is paged by the eNB.

5. Since the UE is in the ECM-idle state, the UE transmits an NAS control plane service request message through the RRC connection request and the S1-AP initial UE message.

6. The eNB acquires the control plane service request message from the RRC connection request message and delivers the acquired control plane service request message to the MME through the S1AP initial UE message.

First, when the CP CIoT EPS optimization is used (A), the transmission procedure of the uplink data will be described.

7. When the S11-U connection is not established, the MME transmits the modify bearer request message to the S-GW for each PDN connection.

The modify bearer request message includes the MME address, the MME TEID DL, the delay downlink packet notification request, the RAT type, and the like.

The S-GW may now transmit the downlink data to the UE.

8-9. The S-GW transmits the modify bearer response message to the P-GW and the P-GW transmits the modify bearer response message to the S-GW.

10. When the modify bearer request message is transmitted in step 7, the S-GW transmits the modify bearer response message to the MME in response to the modify bearer request message.

The modify bearer response message includes the S-GW address and the TEID for the uplink traffic.

The S-GW address and the S-GW TEID for the S11-U user plane are used to deliver the uplink data to the S-GW by the MME.

11. The buffered (when the S11-U is not established) downlink data is transmitted to the MME by the S-GW.

12-13. The MME encrypts and integrity protects the downlink data. In addition, the MME transmits the downlink data to the eNB by using the NAS PDU transferred by the downlink S1-AP message.

14. The NAS PDU accompanying the data is transferred to the UE through the downlink RRC message. This is handled as an implicit acknowledgment of the service request message transmitted in step 5 above by the UE.

15. While the RRC connection is still established, additional uplink and downlink data may be transferred by using the NAS PDU(s). In step 15, transfer of the uplink data using the uplink RRC message encapsulating the NAS PDU accompanying the data is exemplified.

16. The NAS PDU accompanying the data is transmitted to the MME within the uplink S1-AP message.

17. The integrity of the data is checked and the data is decrypted.

18. The MME transmits the uplink data to the P-GW via the S-GW.

19. When the eNB detects that there is no more activity, step 20 is performed.

20. The eNB starts an eNodeB initiated S1 release procedure.

Next, when the UP CIoT EPS optimization is used (B), the transmission procedure of the uplink data will be described.

7. The NAS authentication/security procedure may be performed.

8. The MME transmits the S1-AP initial context setup request message to the eNB.

9. An RRC reconfiguration procedure is performed between the UE and the eNB.

10. The uplink data is transferred to the S-GW from the UE by the eNB.

11. The eNB transmits the S1-AP initial context setup complete message to the MME.

The initial context setup complete message includes the ENB address, the list of accepted EPS bearers, the list of rejected EPS bearers, and the S1 TEID(s) (DL).

12. The MME transmits the modify bearer request message to the S-GW for each PDN connection.

The modify bearer request message includes the eNB address, the S1 TEID(s) (DL) for the accepted EPS bearer, the delay downlink packet notification request, the RAT type, and the like.

13-14. The S-GW transmits the modify bearer response message to the P-GW and the P-GW transmits the modify bearer response message to the S-GW.

15. The S-GW transmits a modify bearer response message to the MME in response to the modify bearer request.

The modify bearer response message includes the S-GW address and the TEID for the uplink traffic.

16. When the eNB detects that there is no more activity, step 19 is performed.

19. The eNB starts the eNodeB initiated S1 release procedure.

Release Assistance Indication/Information (RAI)

The RAI means assistance information for rapid connection release of the UE. When the UE transmits data by using the CP CIoT EPS optimization, the UE may transmit the data additionally including the RAI. For example, in step 1 of FIG. 11 above, the UE may transmit the NAS PDU including the RAI.

An RAI information element (IE) is used to notify to the network whether only single downlink data transmission (e.g., an acknowledgement or a response to the uplink data) subsequent to the uplink data transmission is expected or whether additional uplink or downlink transmission is expected.

The RAI IE may be coded as illustrated in FIG. 13 and Table 3.

The RAI IE is type 1 IE.

FIG. 13 is a diagram illustrating a release assistance indication/information information element in a wireless communication system to which the present invention may be applied.

Referring to FIG. 13, the RAI IE has a length of 1 octet and 4 bits (i.e., 5 to 8 bits) from the most significant bit (MSB) (or left-most bit)) represent an information element identifier (IEI), the next 1 bit (i.e., bit 4) represents a spare bit, and the next one bit (i.e., bit 3) represents the spare bit, and the next two bits represent downlink data expected (DDX).

Table 3 illustrates a description based on a value of the DDX.

TABLE 3

| Release assistance indication value Downlink data expected (DDX) | | |
|---|---|---|
| Bits | | |
| 2 | 1 | |
| 0 | 0 | No information available |
| 0 | 1 | Downlink data transmission subsequent to the uplink data transmission is not expected |
| 1 | 0 | Downlink data transmission subsequent to the uplink data transmission is expected |
| 1 | 1 | Reserved |
| 3 and 4 bits in 1 octet are spare and encoded with 0 | | |

Tracking Area Update/Updating (TAU) Procedure

The TAU procedure as one of the mobility management procedures performed by the MME is one of the important functions for managing the mobility of the UE in the EPS.

Mobility based TAU may be performed when entrance into a new tracking area (TA) that does not exist in the list of tracking area identity(s) is detected (i.e., when the tracking area is changed).

Further, when a periodic TAU (P-TAU) timer set in the UE expires after the UE enters the idle mode, a periodic TAU procedure may be performed. The periodic TAU may be a method for reachability checking for checking the UE effectively exists in the network of the UE.

FIG. 14 illustrates a tracking area update procedure in a wireless communication system to which the present invention may be applied.

FIG. 14 illustrates a TAU procedure accompanying a change of the S-GW.

1. One of predetermined triggers for the start of the TAU procedure occurs, such as a case where the TAU timer of the UE which is in an EPS connection management (ECM)-idle state expires or the UE moves to another tracking area.

2. The UE initiates the TAU procedure by transmitting the TAU request message to the eNB together with an RRC parameter indicating the selected network and an old globally unique MME identifier (GUMMEI).

The TAU request message may include a UE core network capability, a mobile station (MS) network capability, a preferred network behavior, an old globally unique temporary identity (GUTI), an old GUTI type, a last visited TAI, an active flag, an EPS bearer status, a packet temporary mobile subscription (P-TMSI) signature, an additional GUTI, a key set identifier for E-UTRAN, an NAS sequence number, an NAS-message authentication code (MSC), a key set identifier (KSI), and voice domain preference and UE's usage setting.

The active flag is a request by the UE for activation of a radio bearer and an S1 bearer for all active EPS bearer(s) by the TAU procedure when the UE is in the ECM-IDLE state. The EPS bearer status indicates each bearer which is active in the UE.

In the case of the UE using CIoT EPS Optimization having no active PDN connection, the active flag or EPS bearer status is not included in the TAU request message.

3. The ENB derives the MME address from the old GUMMEI, the indicated selected network, and the RRC parameter carrying the RAT. Further, the MME address may be derived based on RRC CIoT EPS optimization information.

The eNB transfers to the MME the TAU request message together with the CSG access mode, the CSG ID, TAI+ECGI, RAT type of a cell receiving the TAU request message, and the selected network.

4. New MME uses the GUTI received from the UE in order to differentiate a type of old node (that is, MME or SGSN) and derive an old MME/S4 SGSN address. In addition, the new MME transmits the context request message to the old MME/old S4 SGSN in order to acquire user information.

The context request message may include an old GUTI, a complete TAU request message, P-TMSI Signature, the MME address, UE validated, and a CIoT EPS optimization support indication.

When the new MME supports the CIoT EPS optimization, the CIoT EPS optimization support indication is included in the context request message indicating the support (for example, supporting the header compression for CP optimization) of various CIoT EPS optimizations.

5. When the context request is transmitted to the old MME, the old MME responds with the context response message.

The context response message may include IMSI, mobile equipment (ME) identity (International mobile station equipment identity and software version number (IM-EISV)), a mobility management (MM) context, EPS bearer context(s), a signaling address and TEID(s) of the S-GW, idle mode signaling (ISR) reduction supported, MS information change reporting action (when usable), CSG information reporting action (when usable), a UE time zone, a UE core network capability, and UE specific DRX parameter(s).

When the new MME supports the CIoT EPS optimization and a robust header compression (RoHC) context to the UE exists, the context response message includes a header compression configuration.

In the case of the UE using CIoT EPS Optimization having no active PDN connection, the EPS bearer context(s) is(are) not included in the context response message.

Based on the CIoT EPS Optimization support indication, the old MME transfers only EPS bearer context(s) supported by the new MME. When the new MME does not support the CIoT EPS Optimization, EPS bearer context(s) of non-IP PDN connection is(are) not transferred to the new MME. When the EPS bearer context(s) of the PDN connection is(are) not transferred, the old MME regards that all bearers for the corresponding PDN connection are unsuccessful and triggers an MME requested PDN disconnection procedure to release the corresponding PDN connection. The data buffered in the old MME is discarded after receiving the context acknowledge message.

6. When integrity check of the TAU request message transmitted in step 2 above is unsuccessful, the authentication is mandatory.

7. The MME (that is, in the case of the new MME by the change of the MME) determines relocation of the S-GW. When an old S-GW may not continuously serve the UE, the S-GW is relocated. The MME (that is, in the case of the new MME by the change of the MME) may also determine relocation of the S-GW when it is expected that the new S-GW serves the UE for a longer time and/or when the new S-GW is further optimized in terms of a P-GW path or when the new S-GW may be co-located with the P-GW.

When the MME is changed, the new MME transmits the context acknowledge message to the old MME/old S4 SGSN.

The context acknowledge message includes an S-GW change indication.

The UE who uses the CIoT EPS Optimization with no active PDN connection skips steps 8, 9, 10, 11, 18, and 19.

8. When the MME is changed, the new MME verifies the EPS bearer status received from the UE using the bearer context received from the old MME/old S4 SGSN. When the MME is not changed, the MME verifies the EPS bearer status from the UE using the bearer context usable in the MM context.

The MME released any network resource associated with the inactive EPS bearer(s) in the UE. When there is no bearer context, the MME rejects the TAU request.

When the MME selects the new S-GW, the MME transmits a Create Session Request message to the selected new S-GW for each PDN connection.

The Create Session Request message may include the IMSI, the bearer context(s), the MME address and TEID, the type, protocol type over S5/S8, the RAT type, a serving network, and the UE time zone.

When the new MMF receives the EPS bearer context accompanying the SCEF, the new MME updates the SCEF.

9. The S-GW transmits the Modify Bearer Request message to the P-GW(s) for each PDN connection.

The Modify Bearer Request message may include the S-GW address and TEID, the RAT type, the serving network, and a PDN charging pause support indication.

9a. When dynamic policy and charging control (PCC) is deployed and RAT type information needs to be delivered from the P-GW to a Policy and Charging Rules Function (PCRF), the P-GW transmits the RAT type information to the PCRF using an IP connectivity access network (IP-CAN) session modification procedure.

10. The P-GW updates the bearer context thereof and sends the Modify Bearer Response message to the S-GW.

The Modify Bearer Response message may include an MSISDN, a charging Id, and a PDN Charging Pause Enabled Indication (when the P-GW selects activation of this function).

11. The S-GW updates the bearer context thereof. Therefore, when the S-GW receives bearer PDU(s) from the eNB, the S-GW may route the bearer PDU(s) to the P-GW.

The S-GW transmits a Create Session Response message to the MME.

The Create Session Response message may include the S-GW address and TEID for the user plane and the control plane, the P-GW TEID(s) (in the case of GPRS Tunneling Protocol (GTP)-based S5 S8) or GRE key(s) (in the case of Proxy Mobile IP (PMIP)-based S5/S8) for the uplink traffic and control plane, and MS Info Change Reporting Action.

12. The new MME verifies whether the subscription data for the UE identified by the IMSI received with the context data from the GUTI, additional GUTI, or old CN node is held.

When there is no subscription data for the UE in the new MME, the new MME transmits an Update Location Request message to the HSS.

The Update Location Request message may include an MME identity (IMSI), Update Location Request Flags (ULR-flag(s)), MME capabilities, Homogeneous Support of IMS Voice over packet switched (PS) Sessions, a UE single radio voice call continuity (SRVCC) capability, an equivalent PLMN list, and an ME identity (IMEISV).

13. The HSS transmits a Cancel Location message with the Cancellation Type set by the update procedure to the old MME.

The Cancel Location message may include the IMSI and the Cancellation Type.

14. When the timer started in step 4 above is not driven, the old MME removes the MM context. Otherwise, the context is removed when the timer expires.

The old MME responds to the HSS with a Cancel Location Ack message containing the IMSI.

15. When the old S4 SGSN receives the Context Acknowledge message and the UE is in the Iu connection state, the old S4 SGSN transmits an Iu Release Command message to the RNC after the timer started in step 4 expires.

16. The RNC responds with an Iu Release Complete message.

17. The HSS transmits to the new MME the Update Location Ack message including the subscription data to acknowledge the Location Update Request message.

18. When the MME is changed, the old MME/old S4 SGSN releases the local MME or SGSN bearer resources when the timer started in step 4 above expires. Additionally, when the S-GW change indication in the Context Acknowledge message is received in step 7, the old MME/old SGSN transmits a Delete Session Request message including a cause and an Operation Indication to the old S-GW to delete the EPS bearer resource.

When the MME is not changed, the old S-GW triggers the release of the EPS bearer resource in step 11.

19. The S-GW acknowledges with a Delete Session Response message including the cause.

The S-GW discards any packet buffered for the corresponding UE.

20. The MME transmits a TAU Accept message to the UE.

The TAU Accept message may include GUTI, TAI list, EPS bearer status, NAS sequence number, NAS-MAC, IMS Voice over PS session supported, Emergency Service Support indicator, Location Service (LCS) Support Indication, and Supported Network Behavior.

When the active flag is set, the MME may provide a Handover Restriction List to the eNB. When the MME allocates new GUTI, the GUTI is included in the TAU Accept message. If the active flag is set in the TAU Request message, the user plane setup procedure is activated with the TAU Accept message. When the DL Data Buffer Expiration Time for the UE in the MME expires, the user plane setup procedure is activated even though the MME does not receive the active flag in the TAU Request message. Even if the new MME does not receive the active flag in the TAU Request message when the new MME receives the Downlink Data Notification message or any downlink signaling message while the UE is still connected, the user plane setup procedure is activated.

In the case of the UE using CIoT EPS Optimization having no active PDN connection, the EPS bearer status is not included in the TAU request message.

21. When the GUTI is included in the TAU Accept, the UE acknowledges the received message by transmitting a TAU Complete message to the MME.

When the active flag is not set in the TAU Request message and the TAU is not initiated in the ECM-CONNECTED state, the new MME releases the signaling connection with the UE according to the S1 release procedure.

After the new MME performs the security function or after the new MME waits for completion of the TAU procedure, the new MME may initiate establishment of E-UTRAN Radio Access Bearer (E-RAB). For the UE, the E-RAB establishment may occur at any time after the TAU request is transmitted.

FIG. 15 illustrates a tracking area update procedure in a wireless communication system to which the present invention may be applied.

FIG. 15 illustrates a TAU procedure accompanying a change of the S-GW and data transfer.

Procedures (A) and (B) in FIG. 15 are defined in FIG. 14 above. In FIG. 15, step 5 differs from FIG. 14 only in one additional parameter, which will be described below.

5. The downlink data is buffered in the old S-GW and when the DL Data Expiration Time does not expire, the old MME/old S4-SGSN indicates buffered DL Data Waiting in the Context Response message. This triggers the new MME to set up the user plane and invoke the data transfer.

In the case of the CP CIoT EPS Optimization, when the downlink data is buffered in the old S-GW and when the Buffered DL Data Waiting is indicated, the new MME sets up the S11 user plane with the new S-GW and invokes the data transfer.

When the downlink data is buffered in the old MME and the DL Data Expiration Time does not expire, the old MME discards the buffered downlink data.

11-12. The user plane is set up.

In the case of the CP CIoT EPS Optimization, step 11 is skipped. In step 12, the MME encapsulates the MME address and MME DL TEID in the Modify Bearer Request message and the S-GW encapsulates the S-GW address and S-GW uplink TEID in the Modify Bearer Response message.

13. Since it is indicated that the buffered downlink data is waiting in step 5, the new MME transmits a Create Indirect Data Forwarding Tunnel Request to the S-GW to set up a forwarding parameter.

In this case, the Create Indirect Data Forwarding Tunnel Request message may include target eNB address(es) and TEID for forwarding.

The S-GW transmits a Create Indirect Data Forwarding Tunnel Response message to the target MME.

In this case, the Create Indirect Data Forwarding Tunnel Response message may include target S-GW address(es) and TEID(s) for forwarding.

In the case of the CP CIoT EPS Optimization, the new MME sets up the forwarding parameter by transmitting the Create Indirect Data Forwarding Tunnel Request message to the S-GW.

In this case, the Create Indirect Data Forwarding Tunnel Request message may include the target MME address(es) and TEID for forwarding.

14. This step is defined in step 7 of FIG. 14 above. Additionally, the new MME encapsulates an F-TEID and a Forwarding indication to which the buffered downlink data is to be forwarded in the Context Acknowledge message. The F-TEID may be an F-TEID for indirect forwarding, which is received from step 13 above or an F-TEID of the eNB (when the eNB supports forwarding).

15. The Modify Bearer Request (including F-TEID) message is transmitted to the old S-GW. The F-TEID is a forwarding F-TEID (F-TEID) to which the buffered downlink data is to be forwarded.

16. The old S-GW forwards the buffered downlink data thereof to the F-TEID received in step 15 above. The buffered downlink data is transmitted to the UE through the radio bearer established in step 11 above. In the case of the CP CIoT EPS Optimization, the buffered downlink data is transmitted from the new S-GW to the new MME and transmitted to the UE.

FIG. 16 illustrates a tracking area update procedure in a wireless communication system to which the present invention may be applied.

FIG. 16 illustrates a TAU procedure without an S-GW change.

1. One of predetermined triggers for the start of the TAU procedure occurs, such as a case where the TAU timer of the UE expires or the UE moves to another tracking area.

2. The UE initiates the TAU procedure by transmitting the TAU request message to the eNB together with an RRC parameter indicating the selected network and the old GUMMEI.

The TAU request message may include a UE core network capability, an MS network capability, a preferred network behavior, an old GUTI, an old GUTI type, a last visited TAI, an active flag, an EPS bearer status, a packet temporary mobile subscription (P-TMSI) signature, an additional GUTI, a key set identifier for E-UTRAN, an NAS sequence number, an NAS-message authentication code (MSC), a key set identifier (KSI), and voice domain preference and UE's usage setting.

The active flag is a request by the UE for activation of a radio bearer and an S1 bearer for all active EPS bearer(s) by the TAU procedure. The EPS bearer state indicates each bearer which is active in the UE.

In the case of the UE using CIoT EPS Optimization having no active PDN connection, the active flag or EPS bearer state is not included in the TAU request message.

3. The eNB derives the MME address from the old GUMMEI, the indicated selected network, and the RRC parameter carrying the RAT. Further, the MME address may be derived based on RRC CIoT EPS optimization information.

The eNB transfers to the MME the TAU request message together with the CSG access mode, the CSG ID, TAI+ECGI, RAT type of a cell receiving the TAU request message, and the selected network.

4. New MME uses the GUTI received from the UE in order to differentiate a type of old node (that is, MME or SGSN) and derive an old MME/S4 SGSN address. In addition, the new MME transmits the context request message to the old MME/old S4 SGSN in order to acquire user information.

The context request message may include an old GUTI, a complete TAU request message, P-TMSI Signature, the MME address, UE validated, and a CIoT EPS optimization support indication.

When the new MME supports the CIoT EPS optimization, the CIoT EPS optimization support indication is included in the context request message indicating the support (for example, supporting the header compression for CP optimization) of various CIoT EPS optimizations.

5. When the context request is transmitted to the old MME, the old MME responds with the context response message.

The context response message may include IMSI, ME identity (IMEISV), unused EPS authentication vectors, KSI_ASME, K_ASME, EPS bearer context(s), a signaling address and TEID(s) of the S-GW, MS information change reporting action (when usable), CSG information reporting action (when usable), a UE time zone, a UE core network capability, and UE specific DRX parameter(s).

When the new MME supports the CIoT EPS optimization and a robust header compression (RoHC) context to the UE exists, the context response message includes a header compression configuration.

In the case of the UE using CIoT EPS Optimization having no active PDN connection, the EPS bearer context(s) is(are) not included in the context response message.

Based on the CIoT EPS Optimization support indication, the old MME transfers only EPS bearer context(s) supported by the new MME. When the new MME does not support the CIoT EPS Optimization, EPS bearer context(s) of non-IP PDN connection is(are) not transferred to the new MME. When the EPS bearer context(s) of the PDN connection is(are) not transferred, the old MME regards that all bearers for the corresponding PDN connection are unsuccessful and triggers an MME requested PDN disconnection procedure to release the corresponding PDN connection. The data buffered in the old MME is discarded after receiving the context acknowledge message.

6. When integrity check of the TAU request message transmitted in step 2 above is unsuccessful, the authentication is mandatory.

7. When the old node is the old MME, the new MME transmits the Context Acknowledge message to the old MME.

When the old node is the old S4 SGSN, the MME transmits the Context Acknowledge message to the old SGSN.

The UE who uses the CIoT EPS Optimization with no active PDN connection skips steps 10, 11, 12, and 13.

9. When the MME is changed, the new MME adopts the bearer context received from the old MME/SGSN as the EPS bearer context of the UE to be held by the new MME.

The MME verifies the EPS bearer status received from the UE with the EPS bearer context and releases any network resource associated with the inactive EPS bearer in the UE. When there is no bearer context, the MME rejects the TAU request.

When the MME is changed, the new MME transmits the Modify Bearer Request message to the S-GW for each PDN connection.

The Modify Bearer Request message may include a new MME address and TEID, ISR activated, and the RAT type.

In the case of the CP CIoT EPS Optimization, the downlink data is buffered to the S-GW, this procedure is a TAU procedure without an MME change, the DL Data Buffer Expiration Time in the MM context for the UE in the MME or this procedure is a TAU procedure accompanying the MME change, and the old MME/old S4-SGSN indicates buffered DL Data Waiting in the Context Response message in step 5 above, the MME encapsulates the MME address and the MME downlink TEID in the Modify Bearer Request.

10. The S-GW transmits the Modify Bearer Request message (including the RAT type) to the P-GW(s) for each PDN connection.

11. When the dynamic PCC is deployed and the RAT type information or UE location information needs to be forwarded from the P-GW to the PCRF, the P-GW transmits the information to the PCRF by using the IP CAN Session Modification procedure.

12. The P-GW updates a context field thereof so that the downlink PDU is routed to an accurate S-GW and sends the Modify Bearer Response message (including the MSISDN) to the S-GW.

13. The S-GW updates the bearer context thereof.

The S-GW transmits the Modify Bearer Response message to the MME in response to the Modify Bearer Request message.

The Modify Bearer Response message may include the S-GW address and TEID for the uplink traffic and the MS Info Change Reporting Action.

In the case of the CP CIoT EPS Optimization, when the MME address and the MME downlink TEID are provided in step 9 above, the S-GW encapsulates the S-GW address and S-GW uplink TEID in the Modify Bearer Response message. The downlink data is transmitted from the S-GW to the MME.

14. The new MME verifies whether the subscription data for the UE identified by the IMSI received with the context data from the GUTI, additional GUTI, or old CN node is held.

When there is no subscription data for the UE in the new MME, the new MME transmits the Update Location Request message to the HSS to inform the HSS of the change of the MME.

The Update Location Request message may include an MME identity, IMSI, Update Location Request Flags (ULR-flag(s)), MME capabilities, Homogeneous Support of IMS Voice over PS Sessions, a UE SRVCC capability, an equivalent PLMN list, and an ME identity (IMEISV).

15. The HSS transmits a Cancel Location message with the Cancellation Type set by the update procedure to the old MME.

The Cancel Location message may include the IMSI and the Cancellation Type.

16. When the timer started in step 4 above is not driven at the time of receiving the Cancel Location message, the old MME removes the MM context. Otherwise, the context is removed when the timer expires.

The old MME responds to the HSS with the Cancel Location Ack message containing the IMSI.

17. When the old S4 SGSN receives the Context Acknowledge message and the UE is in the Iu connection state, the old S4 SGSN transmits an Iu Release Command message to the RNC after the timer started in step 4 expires.

18. The RNC responds with the Iu Release Complete message.

19. The HSS transmits to the new MME the Update Location Ack message including the subscription data to acknowledge the Location Update Request message.

20. The MME transmits a TAU Accept message to the UE.

The TAU Accept message may include GUTI, TAI list, EPS bearer status, NAS sequence number, NAS-MAC, ISR activated, IMS Voice over PS session supported, Emergency Service Support indicator, LCS Support Indication, and Supported Network Behavior.

When the active flag is set, the MME may provide a Handover Restriction List to the eNB. When the active flag is set in the TAU Request message, the user plane setup procedure is activated with the TAU Accept message. When this procedure is a TAU procedure without the MME change and the DL Data Buffer Expiration Time in the MM context for the UE in the MME does not expire or when this procedure is a TAU procedure accompanied by the MME change and the old MME/old S4-SGSN indicates the Buffered DL Data Waiting, the user plane setup procedure is activated even if the MME does not receive the active flag in the TAU Request message. Even if the new MME does not receive the active flag in the TAU Request message when the new MME receives the Downlink Data Notification message or any downlink signaling message while the UE is still connected, the user plane setup procedure may be activated.

In the case of the UE using CIoT EPS Optimization having no active PDN connection, the EPS bearer status is not included in the TAU request message.

The MME indicates the CIoT EPS Optimization supported and preferred by the MME in Supported Network Behavior information.

21. When the GUTI is changed, the UE acknowledges the received message by transmitting the TAU Complete message to the MME.

When the active flag is not set in the TAU Request message and the TAU is not initiated in the ECM-CONNECTED state, the MME releases the signaling connection with the UE according to the S1 release procedure.

After the new MME performs the security function or after the new MME waits for completion of the TAU procedure, the new MME may initiate establishment of E-UTRAN Radio Access Bearer (E-RAB). For the UE, the E-RAB establishment may occur at any time after the TAU request is transmitted.

Hereinafter, the operations in the UE and the MME during the TAU procedure will be described in more detail.

FIG. 17 illustrates a tracking area update procedure in a wireless communication system to which the present invention may be applied.

Referring to FIG. 17, the UE in the EMM-REGISTERED state initiates the TAU procedure by transmitting a TRACKING AREA UPDATE REQUEST message to the MME in the following cases (S1701a and S1701b):

a) when it is detected that the UE enters a TA that is not in the list of TAs that are previously registered in the MME (when the UE is not set to "AttachWithIMSI" or when the UE enters the TA in a new PLMN which is neither a registered PLMN nor a PLMN in an equivalent PLMN list);

b) when a periodic tracking area updating timer T3412 expires;

c) when the UE enters an EMM-REGISTERED.NORMAL-SERVICE (selected by the UE as a basic substate when the UE enters the EMM-REGISTERED state) and a Temporary Identity used in Next update (TIN) indicates "P-TMSI";

d) when the UE performs an inter-system change from the S101 mode (i.e., using the S101 reference point) to the S1 mode (i.e., use of the S1 interface between the access network and the core network) and the user data is pending;

e) when the UE receives an indication from the lower layer that the RRC connection is released due to "load balancing TAU required";

f) when the UE locally deactivates the EPS bearer context (s) in an EMM-REGISTERED.NO-CELL-AVAILABLE state (when the UE is out of E-UTRAN coverage or a Power Saving Mode in the UE is activated) and returns to the EMM-REGISTERED.NORMAL-SERVICE state;

g) when UE network capability information or MS network capability information or both information is changed;

h) when the UE changes a UE specific DRX parameter;

i) when the UE receives an indication of "RRC Connection failure" from the lower layer and there is no pending signaling or user data (i.e., the lower layer requests NAS signaling connection recovery);

j) when the UE enters the S1 mode after 1× Circuit Switched (CS) fallback or 1× Single Radio Voice Call Continuity (SRVCC);

k) when the UE selects a CSG cell having a CSG identity not included in a UE's allowed CSG list or a UE's operator CSG list and an associated PLMN identity due to passive CSG selection;

l) when the UE reselects the E-UTRAN cell while the UE is in a GPRS READY state or a PMM-CONNECTED mode;

m) when UE supports SRVCC to GERAN or UTRAN or Single Radio Video Call Continuity (vSRVCC) to UTRAN and changes mobile station classmark 2 or supported codec or UE supports SRVCC to GERAN and changes mobile station classmark 3;

n) when the UE changes the radio capability of GERAN or cdma2000 or both the radio capabilities;

o) when utilization setting of the UE or the voice domain preference for E-UTRAN is changed in the UE;

p) when the UE activates mobility management for IMS voice termination and the TIN indicates "RAT-related TMSI";

q) when the UE performs the intersystem change from an A/Gb mode to the S1 mode and the TIN indicates the "RAT-related TMSI", but when the UE is required to perform the TAU for the IMS voice termination;

r) when a timer T3346 (mobility management back-off timer) is driven and the UE is in an EMM-REGISTERED.ATTEMPTING-TO-UPDATE state (TAU or combined TAU procedure is unsuccessful due to loss of the response from the network), a paging indication using the S-TMSI is received;

s) when the UE needs to update the network using the EPS bearer context state due to local de-activation of the EPS bearer context(s);

t) when the UE needs to request use of PSM or needs to stop using PSM;

t) when the UE needs to request use of extended DRX (eDRX) or needs to stop using the eDRX;

v) when an eDRX usage condition is changed in the UE and different extended DRX parameters are requested;

w) when the PSM usage condition is changed in the UE and a different timer T3412 (periodic TAU timer) value or a different timer T3324 (active timer) value is requested;

x) when the UE needs to request the CIoT EPS optimization;

In all cases except subclause b above, the UE sets an EPS update type IE in the TRACKING AREA UPDATE REQUEST message to "TA updating". In the case of subclause b, the UE sets the EPS update type IE to "periodic updating".

In the case of subclause n, the UE encapsulates a UE radio capability information update needed IE in the TRACKING AREA UPDATE REQUEST message.

In the case of subclause 1, when the TIN indicates the "RAT-related TMSI", the UE sets the TIN to "P-TMSI" before initiating the TAU procedure.

In the case of subclause r, an "active" flag in the EPS update type IE is set to 1.

When the UE has no established PDN connection, the "active" flag in the EPS update type IE is set to 0.

That is, when the UE is thus in an EMM-REGISTERED.ATTEMPTING-TO-UPDATE state due to a failure in successfully performing the TAU and the like and receives MT paging from the network while a mobility management (MM) back-off timer T3346 is driven, the UE may respond to the paging through the TAU. In this case, the UE particularly sets the "active" flag to 1 to transmit the TAU request message to the MME.

When the UE initiates the TAU procedure, if the UE has established PDN connection(s) and pending uplink user data or has uplink signaling not associated with the TAU procedure, the UE may set the "active" flag in the TRACKING AREA UPDATE REQUEST in order to indicate the request to establish the user plane to the network and to maintain the NAS signaling connection after completion of the TAU procedure.

When the TAU request is accepted by the network, the MME transmits a TRACKING AREA UPDATE ACCEPT message to the UE (S1702a).

The MME may encapsulate a new TAI list for the UE in the TRACKING AREA UPDATE ACCEPT.

Further, when the MME assigns new GUTI to the UE, the GUTI is included in the TRACKING AREA UPDATE ACCEPT message.

Further, during the TAU procedure without the "active" flag, when the MME locally deactivates the EPS bearer context(s) for any reason, the MME encapsulates an EPS bearer context status IE in the TRACKING AREA UPDATE ACCEPT message to inform the UE of the deactivated EPS bearer context(s).

When the "active" flag is included in the TRACKING AREA UPDATE REQUEST message, the MME re-establishes the radio bearer and S1 bearer for all active EPS bearer context(s).

When the "active" flag is not included in the TRACKING AREA UPDATE REQUEST message, the MME may re-establishes the radio bearer and S1 bearer for all active EPS bearer context(s) due to downlink pending data or downlink pending signaling.

When the TRACKING AREA UPDATE ACCEPT message includes the GUTI, the UE responds to the MME with TRACKING AREA UPDATE COMPLETE in order to acknowledge the received GUTI (S1703a).

When the TAU may not be accepted by the network, the MME transmits to the UE a TRACKING AREA UPDATE REJECT message including an appropriate EMM cause value (S1702b).

S1 Release Procedure

The S1 release procedure is used to release the logical S1-AP signaling connection (via S1-MME) and all S1 bearer(s) (in S1-U) for the UE. This procedure releases the S11-U bearer (except for buffering in the MME) in the CP CIoT EPS Optimization instead of the S1-U bearer. This procedure changes the UE and all UEs in the MME from ECM-CONNECTED to ECM-IDLE and all UE related context information is deleted in the eNB. When the S1-AP signaling connection is lost (for example, due to loss of signaling forwarding or the failure of the eNB or MME), the S1 release procedure is performed by the eNB and/or MME. The S1 release procedure is performed locally by the eNB or by the MME and each node locally performs the operation without direct signaling between the eNB and the MME.

The S1 release procedure is initiated as one of the followings.

Cause initiated by the eNB: For example, Operations and Maintenance (O & M) coordination, Unspecified Failure, User Inactivity, Repeated RRC signaling integrity check failures RRC signaling Integrity Check Failure, Release due to UE generated signaling connection release, CS Fallback triggered, Inter-RAT Redirection, etc.; or Cause initiated by the MME: authentication failure, detach, not allowed CSG cell (e.g., the CSG ID of the currently used CSG cell expires or delete from subscription data), etc.

FIG. 18 is a diagram illustrating an S1 release procedure in a wireless communication system to which the present invention may be applied.

1a. In a specific case, the eNB may release the signaling connection of the UE either before or at the same time as requesting the MME to release the S1 context. For example, the eNB may initiate an RRC Connection Release for CS fallback by redirection.

1b. When the eNB detects that the signaling connection of the UE and all radio bearers for the UE need to be released, the eNB transmits an S1 UE Context Release Request message (including the cause) to the MME. The cause indicates the reason for the release (for example, O & M intervention, unspecified failure, user inactivity, repeated integrity checking failure, or release due to UE generated signaling connection release).

Step 1 above is performed only in the S release procedure initiated by the eNB and the S1 release procedure initiated by the MME is performed from step 2.

In the case of the CP EPS Optimization accompanied by data while buffering in the MME, steps 2 and 3 are skipped.

2. When the MME is buffering all S1-U bearer(s) for the UE or S-GW, the MME transmits a Release Access Bearers Request message (an Abnormal Release of Radio Link Indication of the radio link) to the S-GW in order to request the release of S11-U in the CP CIoT EPS Optimization. The message is triggered by the S1 Release Request message or another MME event from the eNB.

3. When the S-GW receives the release access bearers request message, the S-GW releases all eNB related information (i.e., address and TEID(s)) for the UE or MME TEID(s) related information in the CP CIoT EPS Optimization and responds to the MME with the Release Access Bearers Release message. Other elements of the S-GW context of the UE are not influenced. The S-GW maintains an S1-U configuration which the S-GW allocates to the bearer(s) of the UE.

4. The MME releases S1 by transmitting the S1 UE Context Release Command message (including the cause) to the eNB.

5. When the RRC connection is not already released, the eNB transmits the RRC Connection Release message to the UE in Acknowledged Mode (AM). When the message is acknowledged by the UE, the eNB deletes the context of the UE.

6. The eNB confirms the release of S1 by transmitting S1 UE Context Release Complete message (including ECGI and TAI) to the MME. At the same time, the signaling connection between the MME and the eNB for the UE is released. This step is performed immediately after step 4 above.

The MME deletes any eNB related information (i.e., an eNB address used for the S1-MME, an MME UE S1 AP ID, and an eNB UE S1AP ID) from the MME context of the UE, but holds remaining information (address and TEID(s)) of the MME context of the UE including S1-U setting information of the S-GW.

Mobile Originated (MO) Data Control Method During TAU Procedure

When the UE initiates the TAU procedure, if the uplink data to be transmitted to the network is pending, the UE may set the active flag in the TRACKING AREA UPDATE REQUEST message.

In this case, after the MME completes the TAU procedure (i.e., after the TRACKING AREA UPDATE ACCEPT message is transmitted to the UE), the user plane setup procedure is performed. In this case, during the TAU procedure, the path (i.e., entities in the network for uplink data transmission) for the uplink data transmission of the UE and the context of the UE in the corresponding entity are determined, so that the UE may not transmit the uplink data to the network during the TAU procedure and the user plane setup procedure is performed after the TAU procedure is completed.

This is similarly even to the UE using the CIoT EPS Control Plane Optimization.

At present, when the UE initiates the TAU procedure, if the UE has pending uplink data to be transmitted via the user plane, only an operation of setting the active flag in the TRACKING AREA UPDATE REQUEST message is defined. Therefore, in the case of the UE using the CIoT EPS Control Plane Optimization, when the UE initiates the TAU procedure, if the UE has the pending uplink data to be transmitted via the control plane, operations of the UE and the network (e.g., MME) need to be defined.

1) Problem 1 (Uplink View when Reusing Active Flag)

As described above, when the current UE performs the TAU procedure in the IDLE mode, if the NAS layer of the UE has buffered (i.e., pending) data in the UE at the time of transmitting the TRACKING AREA UPDATE REQUEST message, the active flag in the TRACKING AREA UPDATE REQUEST message may be set.

Therefore, when the active flag is set after the TAU procedure is performed, the MME may set up the DRB by performing the Initial Context setup instead of performing the S1 release procedure after transmitting the TRACKING AREA UPDATE ACCEPT message to the UE. That is, when the active flag is set in the TAU Request message, the user plane setup procedure is activated with the TRACKING AREA UPDATE ACCEPT message. In other words, when the active flag is included in the TRACKING AREA UPDATE REQUEST message, the MME re-establishes the radio bearer (i.e., DRB) and S1 bearer for all active EPS bearer context(s).

Since the DRB and the S bearer are established as described above, the UE may transmit the uplink data to be transmitted to the network.

In this case, when data transmission/reception with the UE is not detected, the eNB may request the MME to release the S1 and terminate the connection.

On the contrary, when the current UE uses the CIoT EPS Control Plane Optimization, the DRB bearer and the S1 bearer may not be used for data transmission/reception, and this will be described with reference to the following drawings.

FIG. 19 is a diagram illustrating control plane optimization and user plane optimization in a wireless communication system to which the present invention may be applied.

Referring to FIG. 19, when the current UE uses the User Plane CIoT EPS Optimization, uplink/downlink data transmission and reception may be performed between the UE and the network (for example, P-GW/S-GW) by using a DRB↔S1-U↔SGi path.

On the contrary, when the current UE uses the CIoT EPS Control Plane Optimization, the uplink/downlink data transmission and reception may be performed between the UE and the network (for example, P-GW/S-GW) by using a SRB↔S1-MME↔S11-U path instead of a DRB↔S1-U path using AS security in the related art. Alternatively, the uplink/downlink data transmission and reception may be performed with an application server (AS) via the SCEF.

As described above, when the UE sets the active flag in an ATTACH REQUEST message (or a TRACKING AREA UPDATE REQUEST message) by determining MO data transmission, the MME performs an initial context setup to activate the user plane.

In this case, even if the UE selects Control Plane CIoT EPS Optimization for MO data transmission, when the active flag in the TRACKING AREA UPDATE REQUEST message is set, resource waste and unnecessary signaling at the UE occur due to an unnecessary E-RAB setup operation such as setting up the AS security or the like.

More specifically, when the UE uses only the Control Plane CIoT EPS Optimization, even if the UE desires to transmit uplink data in the control plane, if the active flag in the TRACKING AREA UPDATE REQUEST message is set, as the radio bearer (i.e. DRB) and the S1 bearer are unnecessarily re-established, waste of resources occurs and as unnecessary signaling with the UE occurs, power of the UE is consumed.

Further, when the UE uses both the Control Plane CIoT EPS Optimization and the User Plane CIoT EPS Optimization, even if the UE desires to transmit the uplink data in the control plane, if the active flag in the TRACKING AREA UPDATE REQUEST message is set, similarly thereas the radio bearer (i.e. DRB) and the S1 bearer are unnecessarily re-established, waste of resources occurs and as unnecessary signaling with the UE occurs, power of the UE is consumed. Further, when the DRB is established, the RAI may not be applied, so that the S1 release is delayed. In addition, when the corresponding UE is not an NB-IoT UE (i.e., non NB-IoT UE), AS the DRB is established, the base station may trigger a measurement report to the UE, thereby consuming the power of the UE.

On the contrary, when the UE determines that the DRB setup is not required (i.e., when the UE desires to transmit the uplink data in the control plane) and does not encapsulate the active flag in the ATTACH REQUEST message (or TRACKING AREA UPDATE REQUEST message), the MME performs the S release procedure (see FIG. 18 above) by the operations (see FIG. 14 above) (10 steps in FIG. 15 and 21 steps in FIG. 16) of 21 steps of the TAU procedure.

Step 21 in FIG. 14, step 10 in FIG. 15, and step 21 in FIG. 16 will be described again.

When the active flag is not set in the TRACKING AREA UPDATE REQUEST message and the TAU is not initiated in the ECM-CONNECTED state, the MME releases the signaling connection with the UE according to the S1 release procedure (see FIG. 18 above).

Accordingly, the signaling connection is released without a margin for the UE to transmit the MO data through the SRB. In this case, there are inconvenience and inefficiency that the UE needs to establish the RRC connection again.

2) Problem 2 (Downlink View when Reusing Active Flag)

In addition, when MO data (i.e., uplink data) to be transmitted through the SRB (i.e., via the control plane) is pending when the UE performs the TAU procedure, an operation of whether the active flag is to set is not defined together with the TRACKING AREA UPDATE REQUEST message.

As a result, while the UE is using the Control Plane CIoT EPS Optimization, the UE may not successfully perform the TAU and is in the EMM-REGISTERED.ATTEMPTING-TO-UPDATE state. When the UE receives the MT paging while the MM back-off timer T3346 is being driven, the UE cannot but transmit the TRACKING AREA UPDATE REQUEST message to the MME by setting the active flag even when intending to receive the MT data through the SRB or being capable of receiving the MT data only through the SRB.

This case may correspond to a situation in which an impossible DRB setup is requested or an unnecessary DRB setup is requested, thereby increasing the power consumption of the UE and wasting network resources.

Accordingly, the present invention proposes a method in which user plane activation/setup (i.e., DRB and S1 bearer setup) is not required during the TAU procedure while the UE uses the Control Plane CIoT EPS Optimization, but the UE may transmit the MO data without causing the S1 release immediately after the TAU procedure is completed when the data to be transmitted is pending via the control plane.

Prior to the description of the present invention, terms used in this specification will be described below.

Dedicated bearer: An EPS bearer associated with an uplink packet filter(s) in the UE and a downlink packet filter(s) in a P-GW. Here, only a specific packet matches a filter(s).

Default bearer: An EPS bearer established as every new PDN connection. A context of the default bearer is maintained during a lifetime of the PDN connection.

EPS Mobility Management (EMM)-null (EMM-NULL) state: An EPS service in the UE is deactivated. No EPS mobility management function is also performed.

EMM-DEREGISTERED state: In an EMM-DEREGISTERED state, an EMM context is not established and a UE position is not notified to the MME. Therefore, the UE is unreachable by the MME. In order to establish the EMM context, the UE needs to start an attach procedure or combined attach procedure.

EMM-REGISTERED state: In an EMM-REGISTERED state, the EMM context in the UE is established and a default EPS bearer context is activated. When the UE is in an EMM-IDLE mode, the UE position is notified to the MME with accuracy of a list of TAs including a specific number of a TA. The UE may start transmission and reception of user data and signaling information. Further, a TAU or a combined TAU procedure is performed.

EMM-CONNECTED mode: When an NAS signaling connection is established between the UE and the network, the UE is in the EMM-CONNECTED mode. A term of EMM-CONNECTED may be referred to as a term of the EMM-CONNECTED state.

EMM-IDLE mode: When the NAS signaling connection does not exist between the UE and the network or RRC connection suspend is indicated by the lower layer, the UE is in the EMM-IDLE mode. A term of EMM-IDLE may be referred to as a term of the EMM-IDLE state.

EMM context: When the attach procedure is successfully completed, the EMM context is established in the UE and the MME.

Control plane CIoT EPS optimization: Signaling optimization to enable efficient transport of user data (IP, non-IP or SMS) through a control plane via the MME. The control plane CIoT EPS optimization may selectively include header compression of IP data.

User Plane CIoT EPS optimization: Signaling optimization to enable efficient transport of user data (IP or non-IP) through a user plane EPS service(s): Service(s) provided by the PS domain NAS signaling connection: Peer-to-peer S2 mode connection between the UE and the MME. The NAS signaling connection is configured by concatenation of an RRC connection via an LTE-Uu interface and an S1AP connection via an S1 interface.

UE using EPS services with control plane CIoT EPS optimization: UE attached for EPS service accompanying control plane CIOT EPS optimization accepted by the network 1) First Embodiment: Additional Indication Setting In the first embodiment of the present invention, when the MO data to be transmitted through the SRB (i.e., control plane) is generated during the TAU procedure, two following options are available according to whether to setting the active flag together with the TRACKING AREA UPDATE REQUEST message.

Option 1: According to Option 1, it is proposed that an additional indication flag is defined.

When the UE determines that there is buffered MO data while performing the TAU and the corresponding MO data transmission does not require the AS security setup, i.e., user plane setup (e.g., DRB and S1 bearer setup), a flag (for example, a new flag) for distinguishing it from an existing active flag may be additionally defined.

Hereinafter, in the description of the present invention, the meaning that the active flag and/or the new flag are included in the TRACKING AREA UPDATE REQUEST message may be interpreted to have the same meaning as the active flag and/or the new flag are set.

Hereinafter, the active flag and/or the new flag are set for convenience of description of the present invention, which means that the value of the active flag and/or the new flag is set to '1' unless otherwise noted. In this case, the fact that the active flag and/or the new flag are not set may mean that the value of the active flag and/or the new flag is set to '0'.

Also, in this specification, the new flag newly defined according to the present invention may be referred to as an additional indication flag, a control plane (CP) active flag, a signaling active flag, a first active flag, and the like. Further, the existing defined active flag (i.e., the flag set when there is pending user data to be transmitted via the user plane at the time of initiating the TAU) may be referred to as an active flag or a second active flag.

That is, when the user plane setup (i.e., DRB and S1 bearer setup) is not required but the MO data transmission is required via the control plane (i.e., SRB) and the delay of S1 release is required, the UE may transmit the TAU request message including an indication (i.e., a new flag) that requests the corresponding operation in addition to the active flag. Here, the delay of the release of S means that the initiation of the S release procedure (FIG. 18) is delayed, and the RRC connection and the S1AP connection are released according to the S release procedure, and as a result, the delay of the S release may mean the delay of the release of the NAS signaling connection.

As a result, the new flag may indicate a request to maintain the NAS signaling connection after completion of the TAU procedure.

In other words, when the UE uses the Control Plane CIoT EPS optimization (i.e., signaling optimization to enable the delivery of the user data through the control plane via the MME), and the UE does not have pending user data to be transmitted through the user plane and has pending user data to be transmitted through the control plane via the MME, the new flag may be set in the TRACKING AREA UPDATE REQUEST message.

When the corresponding indication (i.e., new flag) in the TRACKING AREA UPDATE REQUEST is set or included, the MME does not perform the S1 release procedure even after transmitting the TRACKING AREA UPDATE ACCEPT message to the UE and may maintain the NAS signaling connections (i.e., RRC connection and S1AP connection) for a predetermined time.

In other words, when the active flag is not set in the received TRACKING AREA UPDATE REQUEST message and the MME receives the indication (i.e., new flag) that transmission of the MO data without the AS security setup (i.e., user plane setup) is required, the MME may perform the delayed S1 release or may not perform the S1 release.

That is, when the corresponding indication (i.e., new flag) is included (set) in the TRACKING AREA UPDATE REQUEST, the MME may delay the release of the NAS signaling connections (i.e., RRC connection and S1AP connection) after the TAU procedure is completed or may not release the NAS signaling connection (immediately).

When the MME does not perform the S1 release procedure, the eNB may trigger the S1 release procedure by the inactivity of the UE.

As another embodiment of Option 1, a flag/indication used for another purpose in the related art may be included in the TRACKING AREA UPDATE REQUEST message instead of defining the new flag.

For example, the Release Assistant Indication (RAI) introduced in the CIoT EPS Optimization may be used. The RAI includes quick connection release information for data over the NAS transmitted by the UE, but the RAI is included in the TRACKING AREA UPDATE REQUEST message, so that it may be implicitly notified to the network that the data transmission is desired not through the user plane path but by the control plane CIoT EPS optimization (i.e., Data over NAS) after the TAU procedure is terminated. In this case, when the RAI is included in the TRACKING AREA UPDATE REQUEST message transmitted from the UE, the MME may recognize that there is pending data using the data over the NAS for the UE. In addition, accordingly, the MME may not perform the S1 release even after the TAU procedure is successfully performed.

As yet another example, the UE may set the RAI value to 00 (no available information).

Alternatively, regardless of the information depending on the RAI value as shown in Table 3 above, when the RAI is included in the TRACKING AREA UPDATE REQUEST message, the MME may regard that the data over the NAS is pending.

The MME may then determine whether to release the S after receiving the data over the uplink NAS based on the RAI value included in the data included for the UE to transmit the data over the NAS.

Option 2: The additionally defined new flag proposed in Option 1 above may be defined for the purpose of meaning the Control Plane CIoT EPS Optimization.

That is, when the active flag is set in the TRACKING AREA UPDATE REQUEST and the new flag including the meaning of using the Control Plane CIoT EPS Optimization is additionally set, the MME may delay the S1 release or may not initiate the S1 release instead of not performing the initial context setup even though the active flag is set.

However, if the active flag is set but the new flag is not set or if the active flag is set but does not mean the use of the Control Plane CIoT EPS Optimization, the MME performs the initial context setup to establish the DRB (i.e., user plane activation).

In addition, although the received active flag and a combination of the new flag/indication exist in the MO data, the MME may perform the initial context setup when the DRB setup is required by the amount of data buffered to the S-GW and a policy in the direction of the MT even though performing the initial context setup of requesting the DRB setup is not requested.

FIG. 20 illustrates a tracking area update procedure according to an embodiment of the present invention.

Although steps 4 to 20 and 21 of the tracking area update procedure in FIG. 20 illustrate the steps in FIG. 14 above, the present invention may be equally applied to the tracking area update procedure of FIG. 15 above and the tracking area update procedure of FIG. 16.

That is, when the present invention is applied to the tracking area update procedure according to FIG. 15, steps 4 to 20 of the tracking area update procedure in FIG. 20 may be replaced with steps 4 to 10 (TAU Accept) of FIG. 15, and step 21 of the tracking area update procedure in FIG. 20 may be replaced with step 10 (TAU Complete) of FIG. 15.

In addition, when the present invention is applied to the tracking area update procedure according to FIG. 16, steps 4 to 20 of the tracking area update procedure in FIG. 20 may be replaced with steps 4 to 20 of FIG. 15, and step 21 of the tracking area update procedure in FIG. 20 may be replaced with step 21 of FIG. 16.

Step 1: When the TAU procedure is triggered, the UE determines whether there is buffering (or pending) MO data. At this time, the UE may determine whether the MO data to be transmitted via a user plane is pending and/or the MO data to be transmitted via a control plane is pending.

In this case, when the control plane CIoT EPS optimization is applicable (for example, when the control plane CIoT EPS optimization is fixed or when user plane/control plane CIoT EPS optimization both are applicable), the corresponding UE sets a new flag that DRB setup (that is, user plane setup) is not required to transmit a TRACKING AREA UPDATE REQUEST message to the MME.

Here, the new flag may be set by the two options described above.

Step 2: The UE transmits a TRACKING AREA UPDATE REQUEST message including the new flag to the MME.

Steps 4 to 20: An existing tracking area procedure is performed. As described above, steps 4 to 20 of FIG. 14, steps 4 to 10 (TAU Accept) of FIG. 15, or steps 4 to 20 of FIG. 14 may be performed. A detailed description thereof will be omitted.

At this time, if the TRACKING AREA UPDATE REQUEST message transmitted from the UE is accepted by the network in the last step (i.e., step 20 in FIG. 14, step 10 in FIG. 15, or step 20 in FIG. 16), the MME transmits a TRACKING AREA UPDATE ACCEPT message to the UE.

Step 21: The MME determines whether initial context setup is performed (i.e., whether the user plane is set up) and whether S1 release is performed (i.e., whether the NAS signaling connection is released) by the combination of the new flag and the active flag.

If the active flag is included in the TRACKING AREA UPDATE REQUEST message and the control plane CIoT EPS optimization is not used by the MME, the MME may re-establish the radio bearer(s) and S1 bearer(s) for all active EPS bearer contexts.

Alternatively, if the active flag is included in the TRACKING AREA UPDATE REQUEST message and the control plane CIoT EPS optimization is used by the MME, the MME may re-establish the radio bearer(s) and S1 bearer(s) for all active EPS bearer contexts associated with established PDN connection without indication (i.e., CP only indication) of only the control plane.

If it is determined that the initial context setup is not required, but the MO transmission (MME terminal reception) by the CIoT EPS control plane optimization of the UE is required, the S1 release may be delayed and performed, or the MME end may not perform the S1 release and the eNB end may wait for performing the S1 release.

In other words, if the new flag is included in the TRACKING AREA UPDATE REQUEST message and the control plane CIoT EPS optimization is used by the MME, the MME may not release (immediately) the NAS signaling connection after completion of the TAU procedure.

For example, if a GUTI is included in a TRACKING AREA UPDATE ACCEPT message, the UE may acknowledge the received message by transmitting a TRACKING AREA UPDATE COMPLETE message to the MME.

If the active flag (or both the active flag and the new flag) is not set in the TRACKING AREA UPDATE REQUEST message and the TAU procedure is not initiated in an ECM-CONNECTED state, the MME may release the signaling connection of the UE according to the procedure of FIG. 18 above. In the case of the UE using the control plane CIoT EPS optimization, if the new flag (or CP active flag) is set, the MME may not immediately release the NAS signaling connection to the UE after the TAU procedure is completed.

As another example, if the GUTI is included in the TRACKING AREA UPDATE ACCEPT message, the UE may acknowledge the received message by transmitting the TRACKING AREA UPDATE COMPLETE message to the MME.

If the active flag (or both the active flag and the new flag) is not set in the TRACKING AREA UPDATE REQUEST message and the TAU procedure is not initiated in an ECM-CONNECTED state, the MME may release the signaling connection of the UE according to the procedure of FIG. 18 above. In the case of the UE using the control plane CIoT EPS optimization, if the new flag (or CP active flag) is not set in the TRACKING AREA UPDATE REQUEST message, the MME may (immediately) release the NAS signaling connection to the UE after the TAU procedure is completed.

Hereinafter, the operations of the UE and the MME in the tracking area update procedure will be described in more detail with reference to the drawings.

FIG. 21 illustrates a tracking area update procedure according to an embodiment of the present invention.

Referring to FIG. 21, the UE transmits a TRACKING AREA UPDATE REQUEST message to the MME (S2101).

That is, if the triggering condition of the TAU procedure described above is satisfied, the UE initiates the TAU procedure by transmitting the TRACKING AREA UPDATE REQUEST message to the MME.

At this time, according to whether the UE uses control plane CIoT EPS optimization and whether the UE has user data to be transmitted via a control plane, whether a first active flag (i.e., a new flag, a CP active flag, and a signaling active flag) is set in the TRACKING AREA UPDATE REQUEST message may be determined.

For example, when the UE uses the control plane CIoT EPS optimization (i.e., signaling optimization to enable transmission of user data through the control plane via the MME) and the UE has pending user data to be transmitted via the control plane through the MME, not pending user data to be transmitted via the user plane, the first active flag (i.e., a new flag, a CP active flag, and a signaling active flag) may be set in the TRACKING AREA UPDATE REQUEST message.

Further, when the UE uses the control plane CIoT EPS optimization (i.e., signaling optimization to enable transmission of user data through the control plane via the MME) and the UE has uplink signaling not associated with the TAU procedure (e.g., a PDN connectivity request for requesting additional PDN connection including default bearer allocation after the TAU procedure by the UE, request bearer resource modification for requesting modification of bearer resources for a single traffic flow combined with a specific QoS requirement after the TAU procedure by the UE, or the like), the first active flag (i.e., a new flag, a CP active flag, and a signaling active flag) may be set in the TRACKING AREA UPDATE REQUEST message.

At this time, the first active flag may indicate a request to maintain the NAS signaling connection between the UE and the MME after completion of the TAU procedure. In other words, the first active flag is a request for maintaining NAS signaling connection after the TAU procedure is completed by the UE using the control plane CIoT EPS optimization, so that the UE transfers pending data or NAS signaling using data transfer in the control plane CIoT EPS optimization.

The MME transmits a TRACKING AREA UPDATE ACCEPT message to the UE (S2102).

That is, if the TRACKING AREA UPDATE REQUEST is accepted by the network, the MME transmits a TRACKING AREA UPDATE ACCEPT message to the UE.

At this time, the MME operation after the completion of the TAU procedure of the MME (for example, the operation after the transmission of the TRACKING AREA UPDATE ACCEPT message) may be determined depending on whether the first active flag is set in the TRACKING AREA UPDATE REQUEST.

For example, if the first active flag is included in the TRACKING AREA UPDATE REQUEST message, the MME may not (immediately) release the NAS signaling connection after the completion of the TAU procedure. In other words, in the case of the UE using the control plane CIoT EPS optimization, if the first active flag is set in the TRACKING AREA UPDATE REQUEST message, the MME may not release the NAS signaling connection (immediately) after the TAU procedure is completed.

Further, if the first active flag is included in the TRACKING AREA UPDATE REQUEST message and the control plane CIoT EPS optimization is used by the MME, the MME may not release (immediately) the NAS signaling connection after completion of the TAU procedure.

Also, if the first active flag is not included (set) in the TRACKING AREA UPDATE REQUEST message, the MME may release the NAS signaling connection of the UE according to the procedure of FIG. 18 above.

Meanwhile, when the UE receives the TRACKING AREA UPDATE ACCEPT message, it is determined whether a predetermined timer (for example, a T3440 timer) is driven according to whether the first active flag is set in the TRACKING AREA UPDATE REQUEST message.

That is, if the UE does not set the first active flag in the TRACKING AREA UPDATE REQUEST message, the UE starts a predefined timer (e.g., the T3440 timer).

In addition, when the corresponding timer (e.g., the T3440 timer) expires, the UE releases locally established NAS signaling connection.

As described above, the MME may determine a user plane setup (i.e., radio bearer and S1 bearer setup) and/or the NAS signaling disconnection by combining the first active flag (i.e., a new flag, a CP active flag, and a signaling active flag) and a second active flag (i.e., a existing defined active flag).

Referring back to FIG. 21, the UE transmits a TRACKING AREA UPDATE REQUEST message to the MME (S2101).

That is, if the triggering condition of the TAU procedure described above is satisfied, the UE initiates the TAU procedure by transmitting the TRACKING AREA UPDATE REQUEST message to the MME.

At this time, according to whether the UE uses the control plane CIoT EPS optimization and whether the UE has user data to be transmitted via any plane of user plane/control plane, whether the active flag or the first active flag (i.e., a new flag, a CP active flag, and a signaling active flag) is set in the TRACKING AREA UPDATE REQUEST message may be determined.

More specifically, when the UE has pending user data to be transmitted via the user plane (establishing the PDN connection(s)) when the UE initiates the TAU procedure, or when the UE has the uplink signaling unrelated to the TAU procedure when not supporting the control plane CIoT EPS optimization, the UE may set the second active flag (i.e., the existing defined active flag) in the TRACKING AREA UPDATE REQUEST message.

The second active flag (i.e., the existing defined active flag) may indicate the request of the establishment of the user plane and the request for maintaining the NAS signaling after the completion of the TAU procedure to the network.

On the other hand, when the UE uses the control plane CIoT EPS optimization and the UE has pending user data to be transmitted via the control plane through the MME without pending user data to be transmitted via the user plane or has uplink signaling unrelated with the TAU procedure, the first active flag may be set in the TRACKING AREA UPDATE REQUEST message.

The first active flag (i.e., the new flag, the CP active flag, and the signaling active flag) may indicate a request for maintenance of the NAS signaling connection after completion of the TAU procedure. In other words, the first active flag is a request for maintaining the NAS signaling connection after the TAU procedure is completed by the UE using the control plane CIoT EPS optimization, so that the UE transfers pending data or NAS signaling using data transfer in the control plane CIoT EPS optimization.

The MME transmits a TRACKING AREA UPDATE ACCEPT message to the UE (S2102).

That is, if the TRACKING AREA UPDATE REQUEST is accepted by the network, the MME transmits a TRACKING AREA UPDATE ACCEPT message to the UE.

At this time, the MME operation after the completion of the TAU procedure of the MME (for example, the operation after the transmission of the TRACKING AREA UPDATE ACCEPT message) may be determined depending on whether the second active flag is set or the first active flag is set in the TRACKING AREA UPDATE REQUEST.

If the second active flag is included in the TRACKING AREA UPDATE REQUEST message and the control plane CIoT EPS optimization is not used by the MME, the MME may re-establish the radio bearer(s) and S1 bearer(s) for all active EPS bearer contexts.

Alternatively, if the second active flag is included in the TRACKING AREA UPDATE REQUEST message and the control plane CIoT EPS optimization is used by the MME, the MME may re-establish the radio bearer(s) and S1 bearer(s) for all active EPS bearer contexts associated with established PDN connection without indication (i.e., CP only indication) of only the control plane.

Alternatively, if the first active flag is included in the TRACKING AREA UPDATE REQUEST message, the MME may not (immediately) release the NAS signaling connection after the completion of the TAU procedure. In other words, in the case of the UE using the control plane CIoT EPS optimization, if the first active flag is set in the TRACKING AREA UPDATE REQUEST message, the MME may not release the NAS signaling connection (immediately) after the TAU procedure is completed.

In other words, if the first active flag is included in the TRACKING AREA UPDATE REQUEST message and the control plane CIoT EPS optimization is used by the MME, the MME may not (immediately) release the NAS signaling connection after completion of the TAU procedure.

If the second active flag (or both the second active flag and the first active flag) is not set in the TRACKING AREA UPDATE REQUEST message and the TAU procedure is not initiated in an ECM-CONNECTED state, the MME may release the signaling connection of the UE according to the procedure of FIG. 18 above.

Meanwhile, when the UE receives the TRACKING AREA UPDATE ACCEPT message, it is determined whether a predetermined timer (e.g., a T3440 timer) is driven according to whether the second active flag and/or the first active flag are/is set in the TRACKING AREA UPDATE REQUEST message.

That is, if the UE does not set the second active flag in the TRACKING AREA UPDATE REQUEST message, the UE starts the predefined timer (e.g., the T3440 timer). That is, if the UE does not set the first active flag in the TRACKING AREA UPDATE REQUEST message, the UE starts the predefined timer (e.g., the T3440 timer).

In addition, when the corresponding timer (e.g., the T3440 timer) expires, the UE releases locally established NAS signaling connection.

2) Example 2: MME Operation when Transmitting TAU Request Message without Setting Active Flag As described above, currently, when the active flag is not set in the TRACKING AREA UPDATE REQUEST message and the TAU is not initiated in the ECM-CONNECTED state, the MME releases the signaling connection with the UE according to the S1 release procedure (see FIG. 18 above).

On the other hand, according to the present embodiment, when the UE initiates the TAU procedure, if the uplink data to be transmitted to the network via the control plane is pending, the active flag may not be set in the TRACKING AREA UPDATE REQUEST message.

That is, according to the present embodiment, the UE may operate as follows.

If MO data to be transmitted through the SRB (i.e., through the control plane) is pending when the UE performs the TAU procedure, the UE does not set the active flag and transmits only the TRACKING AREA UPDATE REQUEST message to the MME.

If the MO data to be transmitted through the DRB (i.e., through the user plane) is pending when the UE performs the TAU procedure, the UE sets the active flag and transmits the active flag to the MME together with the TRACKING AREA UPDATE REQUEST message.

If the MO data to be transmitted is not generated when the UE performs the TAU procedure, the UE does not set the active flag and transmits only the TRACKING AREA UPDATE REQUEST message to the MME.

According to the present embodiment, even if the MME receives only the TRACKING AREA UPDATE REQUEST message from the UE without setting the active flag, when the MME recognizes that the corresponding UE uses the control plane CIoT EPS optimization (i.e., when the corresponding connection uses only the control plane CIoT EPS optimization, uses both the control plane CIoT EPS optimization and the user plane CIoT EPS optimization, or the connection for SMS transmission), the MME may delay the S release procedure (see FIG. 18 above), or the MME may not initiate the S release procedure (see FIG. 18 above).

That is, the MME may provide a time margin for a predetermined period of time so that the UE may transmit uplink data to the network via the control plane.

According to the present embodiment, there is an advantage that there is no need to define a new flag. However, since this is performed irrespective of whether the uplink data to be transmitted to the UE via the control plane is pending, there is a disadvantage in that the release of the signaling connection is delayed even if there is no uplink data to be transmitted by the UE. In addition, since the signaling connection is maintained for a certain period of time on the UE side, power consumption of the UE is increased.

3) Example 3

When the UE applies the user plane CIoT EPS optimization, the MME recognizes that the ECM-IDLE mode conversion from the ECM-CONNECTED of the UE is previously performed by the RRC suspend procedure (i.e., recognizes that the UE state is suspended) and recognizes that the resume procedure has been successfully performed in the UE and the DRB has been set up (i.e., the MME receives the S1-AP UE context resume request from the eNB (See Section 5.3.5A of 3GPP TS 23.401)), even if the UE does not include the active flag in the ATTACH REQUEST/ TRACKING AREA UPDATE REQUEST, the operation of step 21 of the TAU procedure (see FIG. 14 above) (step 10 in FIG. 15, step 21 in FIG. 16) may not be performed. Then, the connection suspend procedure may be started by an inactivity timer in the eNB.

When it is determined that the connection is suspended (i.e., the ECM-IDLE mode conversion from the previous ECM-CONNECTED is performed in the connection suspend procedure and the UE has the AS context), there is MO data to be transmitted by the UE when the TAU is performed, and the DRB setup is required, the UE still includes (sets) the active flag in the TRACKING AREA UPDATE REQUEST message.

However, even if the active flag is set, the MME may not perform an additional user plane setup (i.e., an initial context setup procedure) if the resume procedure is successfully performed.

At this time, if it is determined that the resume procedure has not been successfully performed and the active flag is set in the TRACKING AREA UPDATE REQUEST message of the UE, the MME may perform a user plane setup (i.e., an initial context setup procedure) so that the update data may be transmitted.

4) Example 4: Setting of New Flag in MT Paging

With respect to the problem 2 described above, the UE may correspond to the following conditions.

i) The UE does not successfully perform the TAU procedure and the like and is in the EMM-REGISTERED.ATTEMPTING-TO-UPDATE state.

ii) The MM backoff timer, T3346, is running.

iii) The UE receives MT paging in a situation of satisfying i) and ii).

In this case, the UE may respond to the paging by initiating the TAU procedure.

At this time, if the UE is configured to use only the control plane CIoT EPS optimization ('control plane only' indication), or if the UE has the capability to receive data through SRB and desires to receive the data through the SRB, the UE may transmit a TRACKING AREA UPDATE REQUEST message to the MME by setting a new flag defined in Example 1) instead of the existing active flag.

The network may operate as follows according to the flag setting when the UE which has transmitted the paging above responds with a TRACKING AREA UPDATE REQUEST message as the response message.

If the new flag is set in the TRACKING AREA UPDATE REQUEST message, the network may not immediately release the NAS signaling connection (i.e., perform the S1 release procedure) or maintain the NAS signaling connection even after the TAU completion.

If the UE has only the capability to transmit the data to the SRB or is configured to CP only, the network needs to transmit the MT data to the SRB. Otherwise, the network may determine whether to transmit MT data to the DRB or SRB by considering the policy of the provider, the resource situation at the time, and the characteristics of the MT data.

The operation of transmitting the data to the DRB is the same as the operation when the active flag is set in the conventional TRACKING AREA UPDATE REQUEST message.

On the other hand, the operation of transmitting the data to the SRB may follow the operation when the DSR for MT paging (piggybacking and transmitting the user data in the ESM data transport message) is received.

For example, the TAU procedure triggering conditions and operations may be defined as follows.

The UE in the EMM-REGISTERED state initiates the TAU procedure by transmitting the TRACKING AREA UPDATE REQUEST message to the MME.

r) If the timer T3346 is running and the UE is in the EMM-REGISTERED.ATTEMPTING-TO-UPDATE state, when receiving a paging indication using the S-TMSI That is, if the r condition is satisfied, the UE in the EMM-REGISTERED state transmits the TRACKING AREA UPDATE REQUEST message to the MME to initiate the TAU procedure.

At this time, in the case of r, if the UE uses only the control plane CIoT EPS optimization or the UE does not have only the PDN connection established with the "control plane only" indication, the active flag may be set to 1 in the EPS update type IE. If the UE uses only the control plane CIoT EPS optimization or the UE has only the PDN connection established with the "control plane only" indication, the "control plane (CP) active flag may be set to 1 in the additional update type IE.

Alternatively, the TAU procedure triggering conditions and operations may be defined as follows.

The UE in the EMM-REGISTERED state initiates the TAU procedure by transmitting the TRACKING AREA UPDATE REQUEST message to the MME.

r) If the timer T3346 is operating and the UE is in the EMM-REGISTERED.ATTEMPTING-TO-UPDATE state, when receiving a paging indication using the S-TMSI That is, if the r condition is satisfied, the UE in the EMM-REGISTERED state transmits the TRACKING AREA UPDATE REQUEST message to the MME to initiate the TAU procedure.

At this time, in the case of r, if the UE is not using the EPS service(s) using the control plane CIoT EPS optimization, the active flag in the EPS update type IE is set to 1. If the UE is using the EPS service(s) using the control plane CIoT EPS optimization, the "CP active" flag in the additional update type IE may be set to 1.

Meanwhile, unlike the embodiment of the present invention described above, the first active flag (i.e., the new flag, the CP active flag, and the signaling active flag) may indicate whether maintenance of the NAS signaling connection is required after completion of the TAU procedure.

For example, referring back to FIG. 21, if the maintenance of the NAS signaling connection between the UE and the MME is required after the completion of the TAU procedure, the UE may set the first active flag to '1' in step S2101.

On the other hand, if the maintenance of the NAS signaling connection between the UE and the MME is not required after the completion of the TAU procedure, the UE may set the first active flag to '0' in step S2101.

According to Examples 1 and 4 above, while the UE is using the EPS service(s) using the control plane CIoT EPS optimization, when the user data to be transmitted through the control plane is pending when the UE initiates the TAU procedure, setting of additional indications (i.e., new flag or CP flag or signaling flag) needs to be added in the TRACKING AREA UPDATE REQUEST message. The following method may be used.

Option 1) Use of Additional Update Type IE

The purpose of the Additional Update Type IE is to provide additional information about the type of request for the combined attach or TAU procedure.

The additional Update Type IE is coded as illustrated in FIG. 22 and Table 4 below.

The EPS update type IE is a type 1 IE.

FIG. 22 is a diagram illustrating an additional update type information element according to an embodiment of the present invention.

Referring to FIG. 22, the additional Update Type IE has a length of 1 octet, 4 bits (i.e., bit 5 to bit 8) from the most significant bit (MSB) (alternatively, the left-most bit) indicates an additional update type information element identifier (IEI), and the next 2 bits (i.e., bit 4 and bit 3) indicates a preferred CIoT network behaviour (PNB-CIoT), the next 1 bit (i.e., bit 2) indicates a NEW flag (i.e., first active flag), and the next 1 bit (i.e., bit 1) indicates an additional update type value (AUTV).

TABLE 4

| Additional update type value (AUTV) (octet 1) | |
|---|---|
| Bit 1 | |
| 0 | No additional information. If received, it is interpreted as a request for a combined attach or a combined TAU. |
| 1 | SMS only |

| Additional indication setting (octet 1) | |
|---|---|
| Bit 2 | |
| 0 | Immediately connection release after completion of the procedure (i.e., release connection immediately after completion of TAU, etc. like the operation in the related art) |
| 1 | Presence of MO data (MO data over NAS) through NAS/Connection retention/No DRB setup (do not release immediately after completion of TAU, etc.) |

| Preferred CIoT network behaviour (PNB-CIoT) (Octet 1) | | |
|---|---|---|
| Bit | | |
| 4 | 3 | |
| 0 | 0 | No additional information |
| 0 | 1 | Control-plane CIoT EPS optimization |
| 1 | 0 | User-plane EPS optimization |
| 1 | 1 | Reserved |

Option 2) Use of EPS Update Type IE

The purpose of the EPS update type IE is to specify an area related with the update procedure.

The EPS update type IE is coded as illustrated in FIG. 23 and Table 5 below.

The EPS update type IE is a type 1 IE.

FIG. 23 is a diagram illustrating an EPS update type information element according to an embodiment of the present invention.

Referring to FIG. 23, the EPS update type IE has a length of one octet, 4 bits (i.e., bit 5 to bit 8) from the most significant bit (MSB) (alternatively, the left-most bit) Indicates an EPS update type information element identifier (IEI), the next 1 bit (i.e., bit 4) indicates the "Active" flag, the next 1 bit (i.e., bit 3) indicates a NEW Flag, and the next two bits (i.e., bit 2 and bit 1) indicate EPS update type values.

TABLE 5

| EPS update type value (octet 1, bits 1 to 3) | | |
|---|---|---|
| Bits | | |
| 2 | 1 | |
| 0 | 0 | TA updating |
| 0 | 1 | Combined TA/LA (Location Area) updating |

TABLE 5-continued

| | | |
|---|---|---|
| 1 | 0 | Combined TA/LA updating with IMSI attachment |
| 1 | 1 | Periodic updating |

| Additional indication setting (octet 1, bit 3) |
|---|
| Bit 3 |
| 0 Immediately connection release after completion of the procedure (i.e., release connection immediately after procedure completion of TAU, etc. like the operation in the related art) |
| 1 Presence of MO data (MO data over NAS) through NAS/Connection retention/No DRB setup (do not release immediately after completion of TAU, etc.) |

| "Active" flag (octet 1, bit 4) | |
|---|---|
| Bit 4 | |
| 0 | No bearer establishment request |
| 1 | Bearer establishment request |

Option 3) Definition and use of new IE

The transmission of the tracking area update request to the network by the UE is shown in Table 6 below.

Table 6 illustrates TRACKING AREA UPDATE REQUEST message contents.

TABLE 6

| Information element identifier (IEI) | Information element | Type/Reference | Presence | Format | Length |
|---|---|---|---|---|---|
| | Protocol discriminator | Protocol discriminator TS 24.301 9.2 | M | V | 1/2 |
| | Security header type | Security header type TS 24.301 9.3.1 | M | V | 1/2 |
| | Tracking area update request message identity | Message type TS 24.301 9.8 | M | V | 1 |
| | EPS update type | EPS update type TS 24.301 9.9.3.14 | M | V | 1/2 |
| | NAS key set identifier | NAS key set identifier TS 24.301 9.9.3.21 | M | V | 1/2 |
| | Old GUTI | EPS mobile identity TS 24.301 9.9.3.12 | M | LV | 12 |
| B- | Non-current native NAS key set identifier | NAS key set identifier TS 24.301 9.9.3.21 | O | TV | 1 |
| 8- | GPRS ciphering key sequence number | Ciphering key sequence number TS 24.301 9.9.3.4a | O | TV | 1 |
| 19 | Old P-TMSI signature | P-TMSI signature TS 24.301 9.9.3.26 | O | TV | 4 |
| 50 | Additional GUTI | EPS mobile identity TS 24.301 9.9.3.12 | O | TLV | 13 |
| 55 | NonceUE | Nonce TS 24.301 9.9.3.25 | O | TV | 5 |
| 58 | UE network capability | UE network capability TS 24.301 9.9.3.34 | O | TLV | 4-15 |
| 52 | Last visited registered TAI | Tracking area identity TS 24.301 9.9.3.32 | O | TV | 6 |
| 5C | DRX parameter | DRX parameter TS 24.301 9.9.3.8 | O | TV | 3 |
| A- | UE radio capability information update needed | UE radio capability information update needed TS 24.301 9.9.3.35 | O | TV | 1 |
| 57 | EPS bearer context status | EPS bearer context status TS 24.301 9.9.2.1 | O | TLV | 4 |
| 31 | MS network capability | MS network capability TS 24.301 9.9.3.20 | O | TLV | 4-10 |

TABLE 6-continued

| Information element identifier (IEI) | Information element | Type/Reference | Presence | Format | Length |
|---|---|---|---|---|---|
| 13 | Old location area identification | Location area identification TS 24.301 9.9.2.2 | O | TV | 6 |
| 9- | TMSI status | TMSI status TS 24.301 9.9.3.31 | O | TV | 1 |
| 11 | Mobile station classmark 2 | Mobile station classmark 2 TS 24.301 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List TS 24.301 9.9.2.10 | O | TLV | 5-n |
| F- | Additional update type | Additional update type TS 24.301 9.9.3.0B | O | TV | 1 |
| 5D | Voice domain preference and UE's usage setting | Voice domain preference and UE's usage setting TS 24.301 9.9.3.44 | O | TLV | 3 |
| E- | Old GUTI type | GUTI type TS 24.301 9.9.3.45 | O | TV | 1 |
| D- | Device properties | Device properties TS 24.301 9.9.2.0A | O | TV | 1 |
| C- | MS network feature support | MS network feature support TS 24.301 9.9.3.20A | O | TV | 1 |
| 10 | TMSI based network resource identifier (NRI) container | Network resource identifier container TS 24.301 9.9.3.24A | O | TLV | 4 |
| 6A | T3324 value | GPRS timer 2 TS 24.301 9.9.3.16 | O | TLV | 3 |
| 5E | T3412 extended value | GPRS timer 3 TS 24.301 9.9.3.16B | O | TLV | 3 |
| 6E | Extended DRX parameters | Extended DRX parameters TS 24.301 9.9.3.46 | O | TLV | 3 |
| XX | New Indication for Connection release | New Indication for Connection release TS 24.301 9.9.3.XX | O | TV | 1 |

New indication for connection release IE is coded as illustrated in FIG. 24 and Table 7 below.

FIG. 24 is a diagram illustrating a new indication information element for connection release according to an embodiment of the present invention.

Referring to FIG. 24, a new indication IE for connection release has a length of 1 octet and 4 bits (i.e., 5 to 8 bits) from the most significant bit (MSB) (or left-most bit)) represent an additional update type information element identifier (IEI), the next 3 bits (i.e., bits 4, 3, and 2) represent spare bits, and the next one bit (i.e., bit 1) represents a new flag.

Table 7 shows a New Indication for Connection release IE.

TABLE 7

| Additional indication setting (octet 1, bit 1) | |
|---|---|
| Bits 1 | |
| 0 | connection release after procedure completion (releasing connection immediately after completion of the TAU, etc. like the operation in the related art) |

TABLE 7-continued

| Additional indication setting (octet 1, bit 1) | |
|---|---|
| Bits 1 | |
| 1 | MO data over NAS exists/connection is maintained/DRB is not set up (not immediately released immediately after termination of the TAU, etc.) |

Overview of Devices to which the Present Invention can be Applied

FIG. 25 illustrates a block diagram of a communication device according to one embodiment of the present invention.

With reference to FIG. 25, a wireless communication system comprises a network node 2510 and a plurality of UEs 2520.

A network node 2510 comprises a processor 2511, memory 2512, and communication module 2513. The processor 2511 implements proposed functions, processes and/or methods proposed through FIG. 1 to FIG. 24. The processor 2511 can implement layers of wired/wireless interface protocol. The memory 2512, being connected to the processor 2511, stores various types of information for driving the processor 2511. The communication module 2513, being connected to the processor 2511, transmits and/or receives wired/wireless signals. Examples of the network node 2510 include an eNB, MME, HSS, SGW, PGW, application server and so on. In particular, in case the network node 2510 is an eNB, the communication module 2513 can include a Radio Frequency (RF) unit for transmitting/receiving a radio signal.

The UE 2520 comprises a processor 2521, memory 2522, and communication module (or RF unit) 2523. The processor 2521 implements proposed functions, processes and/or methods proposed through FIG. 1 to FIG. 24. The processor 2521 can implement layers of wired/wireless interface protocol. The memory 2522, being connected to the processor 2521, stores various types of information for driving the processor 2521. The communication module 2523, being connected to the processor 2521, transmits and/or receives wired/wireless signals.

The memory 2512, 2522 can be installed inside or outside the processor 2511, 2521 and can be connected to the processor 2511, 2521 through various well-known means. Also, the network node 2510 (in the case of an eNB) and/or the UE 2520 can have a single antenna or multiple antennas.

FIG. 26 illustrates a block diagram of a wireless communication apparatus according to an embodiment of the present invention.

Particularly, in FIG. 26, the UE described above FIG. 25 will be exemplified in more detail.

Referring to FIG. 26, the UE includes a processor (or digital signal processor) 2610, RF module (RF unit) 2635, power management module 2605, antenna 2640, battery 2655, display 2615, keypad 2620, memory 2630, Subscriber Identification Module (SIM) card 2625 (which may be optional), speaker 2645 and microphone 2650. The UE may include a single antenna or multiple antennas.

The processor 2610 may be configured to implement the functions, procedures and/or methods proposed by the present invention as described in FIG. 1-24. Layers of a wireless interface protocol may be implemented by the processor 2610.

The memory 2630 is connected to the processor 2610 and stores information related to operations of the processor 2610. The memory 2630 may be located inside or outside the processor 2610 and may be connected to the processors 2610 through various well-known means.

A user enters instructional information, such as a telephone number, for example, by pushing the buttons of a keypad 2620 or by voice activation using the microphone 2650. The microprocessor 2610 receives and processes the instructional information to perform the appropriate function, such as to dial the telephone number. Operational data may be retrieved from the SIM card 2625 or the memory module 2630 to perform the function. Furthermore, the processor 2610 may display the instructional and operational information on the display 2615 for the user's reference and convenience.

The RF module 2635 is connected to the processor 2610, transmits and/or receives an RF signal. The processor 2610 issues instructional information to the RF module 2635, to initiate communication, for example, transmits radio signals comprising voice communication data. The RF module 2635 comprises a receiver and a transmitter to receive and transmit radio signals. An antenna 2640 facilitates the transmission and reception of radio signals. Upon receiving radio signals, the RF module 2635 may forward and convert the signals to baseband frequency for processing by the processor 2610. The processed signals would be transformed into audible or readable information outputted via the speaker 2645.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:
1. A method for performing, by a user equipment (UE), a tracking area update (TAU) procedure in a wireless communication system, the method comprising:
    transmitting a TAU request message to a mobility management entity (MME);
    receiving a TAU accept message from the MME; and
    starting a predetermined timer based on a first active flag in the TAU request message not being set,
    wherein when the UE uses signaling optimization to enable the delivery of user data through a control plane via the MME, and the UE does not have pending user data to be transmitted through a user plane and has pending user data to be transmitted through the control plane via the MME, then the first active flag is set in the TAU request message.

2. The method of claim 1, wherein the first active flag is used for a request for maintaining a non-access stratum (NAS) signaling connection between the UE and the MME after completion of the TAU procedure.

3. The method of claim 1, wherein the first active flag is included in an additional update type information element for providing additional information regarding a type of a request for the TAU procedure in the TAU request message.

4. The method of claim 3, wherein when a value of the first active flag is '0', the non-access stratum (NAS) signaling connection between the UE and the MME is not maintained after the completion of the TAU procedure.

5. The method of claim 3, wherein when a value of the first active flag is '1', the non-access stratum (NAS) signaling connection between the UE and the MME is maintained after the completion of the TAU procedure.

6. The method of claim 1, wherein based the timer expiring, the non-access stratum (NAS) signaling connection between the UE and the MME is released by the UE.

7. The method of claim 1, wherein when the UE does not successfully perform the TAU procedure and a mobility management (MM) back-off timer is driven, the UE transmits the TAU request after receiving a paging.

8. The method of claim 1, wherein when the UE has the pending user data through the user plane, a second active flag is set in the TAU request message.

9. A user equipment (UE) performing a tracking area update (TAU) procedure in a wireless communication system, the user equipment comprising:
a transceiver;
at least one processor; and
at least one computer memory operable connectable to the at least one processor and storing instructions that, when executed by the at least one processor, perform operations comprising:
transmitting, via the transceiver, a TAU request message to a mobility management entity (MME);
receiving, via the transceiver, a TAU accept message from the MME; and
starting a predetermined timer based on a first active flag in the TAU request message not being set,
wherein when the UE uses signaling optimization to enable the delivery of user data through a control plane via the MME, and the UE does not have pending user data to be transmitted through a user plane and has pending user data to be transmitted through the control plane via the MME, then the first active flag is set in the TAU request message.

10. The user equipment of claim 9, wherein the first active flag is used for a request for maintaining a non-access stratum (NAS) signaling connection between the UE and the MME after completion of the TAU procedure.

11. The user equipment of claim 9, wherein the first active flag is included in an additional update type information element for providing additional information regarding a type of a request for the TAU procedure in the TAU request message.

12. The user equipment of claim 11, wherein when a value of the first active flag is '0', the non-access stratum (NAS) signaling connection between the UE and the MME is not maintained after the completion of the TAU procedure.

13. The user equipment of claim 11, wherein when a value of the first active flag is '1', the non-access stratum (NAS) signaling connection between the UE and the MME is maintained after the completion of the TAU procedure.

14. The user equipment of claim 9, wherein based the timer expiring, the non-access stratum (NAS) signaling connection between the UE and the MME is released by the UE.

15. The user equipment of claim 9, wherein when the UE does not successfully perform the TAU procedure and a mobility management (MM) back-off timer is driven, the UE transmits the TAU request after receiving a paging.

16. The user equipment of claim 9, wherein when the UE has the pending user data through the user plane, a second active flag is set in the TAU request message.

* * * * *